(12) United States Patent
Razaghi

(10) Patent No.: US 12,321,506 B2
(45) Date of Patent: *Jun. 3, 2025

(54) SECURE ELECTRONIC CIRCUITRY WITH TAMPER DETECTION

(71) Applicant: Block, Inc., Oakland, CA (US)

(72) Inventor: Mani Razaghi, San Francisco, CA (US)

(73) Assignee: Block, Inc., Oakland, CA (US)

( * ) Notice: Subject to any disclaimer, the term of this patent is extended or adjusted under 35 U.S.C. 154(b) by 89 days.

This patent is subject to a terminal disclaimer.

(21) Appl. No.: 18/143,420

(22) Filed: May 4, 2023

(65) Prior Publication Data

US 2023/0274039 A1    Aug. 31, 2023

Related U.S. Application Data

(63) Continuation of application No. 17/214,307, filed on Mar. 26, 2021, now Pat. No. 11,681,833, which is a
(Continued)

(51) Int. Cl.
G06F 21/87    (2013.01)
(52) U.S. Cl.
CPC .................................... *G06F 21/87* (2013.01)
(58) Field of Classification Search
CPC ....................................................... G06F 21/87
See application file for complete search history.

(56) References Cited

U.S. PATENT DOCUMENTS 3,276,032 A    9/1966    Ordower
4,654,631 A *  3/1987   Kurcbart ................ G08B 5/225
                                                             24/3.12
(Continued)

FOREIGN PATENT DOCUMENTS

DE    19512266 A1    3/1996
DE    10337567 B3    1/2005
(Continued)

OTHER PUBLICATIONS

Balaban, D., "Google's Schmidt Predicts Contactless Terminal Rollout," NFC Times, published Jun. 23, 2011, Retrieved from the Internet URL: http://www.nfctimes.com/news/google-s-schmidt-predicts-contactless-terminal-rollout, on Aug. 25, 2015, pp. 1-4.

*Primary Examiner* — Meng Li
(74) *Attorney, Agent, or Firm* — Polsinelli PC

(57)    ABSTRACT

A circuit board is protected by being enclosed in a security housing that includes conductive tamper traces running along its interior surface, the conductive tamper traces being a housing portion of a tamper detection circuit. The tamper detection circuit also includes a board portion that detect tampering with the tamper detection circuit by monitoring voltages at monitor nodes along the board portion. The board portion of the tamper detection circuit is connected to the tamper traces via multiple connector pieces. The connector pieces can be held in place by board connector piece holders affixed to the board or housing connector piece holders of the housing. When tampering is detected, it can be localized based on voltages measured at multiple recesses along the housing. The tamper detection circuit can be arranged in a wheatstone bridge layout for environmental tolerance. The circuit board's functions/components can be disabled if tampering is detected.

20 Claims, 16 Drawing Sheets

Related U.S. Application Data continuation of application No. 16/248,980, filed on Jan. 16, 2019, now Pat. No. 10,977,393, which is a continuation of application No. 15/250,468, filed on Aug. 29, 2016, now Pat. No. 10,192,076.

(56) References Cited

U.S. PATENT DOCUMENTS

| | | | |
|---|---|---|---|
| 4,691,350 A | 9/1987 | Kleijne et al. | |
| 4,721,862 A * | 1/1988 | Cooper | H01H 85/20 361/833 |
| 4,811,288 A | 3/1989 | Kleijne et al. | |
| 5,027,397 A * | 6/1991 | Double | H01L 23/576 713/194 |
| 5,233,505 A | 8/1993 | Chang et al. | |
| 5,574,600 A * | 11/1996 | Agro | F21V 17/164 359/813 |
| 5,666,265 A | 9/1997 | Lutz et al. | |
| 5,748,083 A * | 5/1998 | Rietkerk | G08B 13/128 340/687 |
| 5,791,731 A * | 8/1998 | Infanti | A47C 15/004 297/217.3 |
| 5,880,523 A | 3/1999 | Candelore | |
| 6,084,905 A | 7/2000 | Ishifuji et al. | |
| 6,144,800 A | 11/2000 | Kobayashi | |
| 6,193,152 B1 | 2/2001 | Fernando et al. | |
| 6,230,972 B1 | 5/2001 | Dames et al. | |
| 6,234,389 B1 | 5/2001 | Valliani et al. | |
| 6,247,645 B1 | 6/2001 | Harris et al. | |
| 6,492,978 B1 | 12/2002 | Selig et al. | |
| 6,557,754 B2 | 5/2003 | Gray et al. | |
| 6,715,078 B1 | 3/2004 | Chasko et al. | |
| 7,049,970 B2 | 5/2006 | Allen et al. | |
| 7,098,643 B1 * | 8/2006 | Kim | G01R 31/67 324/66 |
| 7,270,275 B1 * | 9/2007 | Moreland | H01H 13/702 200/61.93 |
| 7,343,496 B1 | 3/2008 | Hsiang et al. | |
| 7,373,667 B1 | 5/2008 | Millard | |
| 7,428,984 B1 | 9/2008 | Crews et al. | |
| 7,474,550 B2 | 1/2009 | Fujisawa et al. | |
| 7,806,341 B2 | 10/2010 | Farooq et al. | |
| 8,310,370 B1 * | 11/2012 | Williams, Jr. | G01R 19/2513 702/57 |
| 8,701,997 B2 | 4/2014 | Dorsey et al. | |
| 8,814,045 B1 | 8/2014 | Brockhouse et al. | |
| 9,203,546 B1 | 12/2015 | Wade et al. | |
| 9,298,956 B2 | 3/2016 | Wade et al. | |
| 9,449,192 B1 | 9/2016 | Wade et al. | |
| 9,554,477 B1 * | 1/2017 | Brodsky | H05K 3/22 |
| 9,578,763 B1 | 2/2017 | Wade | |
| 9,730,315 B1 * | 8/2017 | Razaghi | H05K 1/0275 |
| 9,852,422 B1 | 12/2017 | Wade et al. | |
| 9,880,649 B2 | 1/2018 | Agarwal et al. | |
| 9,913,778 B2 | 3/2018 | Dvorak et al. | |
| 9,958,996 B2 | 5/2018 | Marques et al. | |
| 10,101,860 B2 | 10/2018 | Marques et al. | |
| 10,139,975 B2 | 11/2018 | Shutzberg et al. | |
| 10,140,604 B1 | 11/2018 | Douthat et al. | |
| 10,192,076 B1 * | 1/2019 | Razaghi | G06F 21/87 |
| 10,251,260 B1 * | 4/2019 | Razaghi | G06F 21/86 |
| 10,455,441 B2 | 10/2019 | Baroudi et al. | |
| 10,504,096 B1 | 12/2019 | Hafemann et al. | |
| 10,595,400 B1 | 3/2020 | Razaghi et al. | |
| 10,613,655 B2 | 4/2020 | Yoon et al. | |
| 10,733,589 B2 | 8/2020 | Douthat et al. | |
| 10,890,795 B2 | 1/2021 | Xie et al. | |
| 10,977,393 B2 | 4/2021 | Razaghi | |
| 11,003,913 B2 | 5/2021 | Lee et al. | |
| 2001/0056542 A1 * | 12/2001 | Cesana | G08B 13/128 257/902 |
| 2002/0060869 A1 | 5/2002 | Sawaguchi et al. | |
| 2003/0137416 A1 * | 7/2003 | Fu | G06Q 20/341 340/568.1 |
| 2005/0039052 A1 | 2/2005 | O'Donnell et al. | |
| 2005/0088303 A1 * | 4/2005 | Allen | G08B 13/149 340/568.4 |
| 2005/0191878 A1 | 9/2005 | Castle | |
| 2005/0218229 A1 | 10/2005 | Morley, Jr. et al. | |
| 2005/0219728 A1 | 10/2005 | Durbin et al. | |
| 2005/0225445 A1 * | 10/2005 | Petersen | G06K 19/073 340/568.2 |
| 2005/0274630 A1 | 12/2005 | Clark et al. | |
| 2005/0275538 A1 | 12/2005 | Kulpa | |
| 2006/0038011 A1 | 2/2006 | Baker et al. | |
| 2006/0102458 A1 | 5/2006 | Kim et al. | |
| 2006/0220850 A1 | 10/2006 | Bowser et al. | |
| 2006/0238301 A1 | 10/2006 | Wu et al. | |
| 2007/0131768 A1 | 6/2007 | Wakabayashi | |
| 2007/0271189 A1 | 11/2007 | Morten et al. | |
| 2007/0290845 A1 | 12/2007 | Benjelloun et al. | |
| 2007/0293142 A1 | 12/2007 | Dehmas et al. | |
| 2008/0110987 A1 | 5/2008 | Cato et al. | |
| 2008/0164320 A1 | 7/2008 | Garrido-Gadea et al. | |
| 2008/0278217 A1 * | 11/2008 | Hankhofer | H05K 1/0275 327/509 |
| 2008/0284610 A1 | 11/2008 | Hunter | |
| 2008/0296377 A1 | 12/2008 | Hopt et al. | |
| 2008/0309396 A1 | 12/2008 | Lee | |
| 2009/0070658 A1 | 3/2009 | Patapoutian et al. | |
| 2009/0282375 A1 * | 11/2009 | Habib | G01K 7/425 374/114 |
| 2009/0291635 A1 | 11/2009 | Savry | |
| 2010/0034434 A1 | 2/2010 | von Mueller et al. | |
| 2010/0244818 A1 | 9/2010 | Atwood et al. | |
| 2010/0327856 A1 | 12/2010 | Lowy | |
| 2011/0031985 A1 | 2/2011 | Johnson | |
| 2011/0048756 A1 | 3/2011 | Shi et al. | |
| 2011/0055566 A1 | 3/2011 | Norrman et al. | |
| 2011/0090658 A1 | 4/2011 | Adams et al. | |
| 2011/0135092 A1 | 6/2011 | Lehner | |
| 2011/0253788 A1 | 10/2011 | Campbell et al. | |
| 2012/0000982 A1 | 1/2012 | Gao et al. | |
| 2012/0002313 A1 | 1/2012 | Miyabe et al. | |
| 2012/0009826 A1 * | 1/2012 | Selwood | G06F 21/86 439/660 |
| 2012/0047374 A1 | 2/2012 | Klum et al. | |
| 2012/0056755 A1 * | 3/2012 | Hanft | H04Q 9/00 340/870.07 |
| 2012/0091201 A1 | 4/2012 | Babu et al. | |
| 2012/0151607 A1 | 6/2012 | Chambourov | |
| 2012/0163434 A1 | 6/2012 | Kim et al. | |
| 2012/0286760 A1 | 11/2012 | Carapelli et al. | |
| 2013/0044003 A1 | 2/2013 | Eguro et al. | |
| 2013/0055416 A1 | 2/2013 | Ma et al. | |
| 2013/0104252 A1 | 4/2013 | Yanamadala et al. | |
| 2013/0111227 A1 | 5/2013 | Sauerwein, Jr. | |
| 2014/0002239 A1 | 1/2014 | Rayner | |
| 2014/0049887 A1 * | 2/2014 | Salle | G06F 21/86 361/679.01 |
| 2014/0070006 A1 | 3/2014 | Weldele et al. | |
| 2014/0081874 A1 | 3/2014 | Lewis et al. | |
| 2014/0124576 A1 | 5/2014 | Zhou et al. | |
| 2014/0204529 A1 | 7/2014 | White et al. | |
| 2014/0211336 A1 | 7/2014 | Liao et al. | |
| 2015/0006376 A1 | 1/2015 | Nuthulapati et al. | |
| 2015/0224892 A1 * | 8/2015 | Callicoat | B60L 50/64 29/857 |
| 2015/0254961 A1 * | 9/2015 | Brandl | G08B 21/185 340/663 |
| 2016/0139425 A1 * | 5/2016 | Park | G03B 5/02 359/557 |
| 2016/0145904 A1 * | 5/2016 | Lowder | E05B 47/0001 292/145 |
| 2016/0356666 A1 | 12/2016 | Bilal et al. | |
| 2017/0104325 A1 | 4/2017 | Eriksen et al. | |
| 2017/0324195 A1 | 11/2017 | Eriksen et al. | |
| 2020/0090153 A1 | 3/2020 | Hafemann et al. | |
| 2021/0216669 A1 | 7/2021 | Razaghi | |

(56) References Cited

U.S. PATENT DOCUMENTS

FOREIGN PATENT DOCUMENTS

| | | |
|---|---|---|
| DE | 10340289 A1 | 3/2005 |
| DE | 10-2005-015357 A1 | 10/2006 |
| DE | 10-2006-039136 A1 | 3/2007 |
| DE | 10-2009-0026466 B3 | 7/2010 |
| DE | 10-2010-0040942 A1 | 3/2012 |
| DE | 10-2012-0203474 A1 | 9/2013 |
| KR | 10-2008-0105500 A | 12/2008 |
| WO | 2004/086202 A1 | 10/2004 |

* cited by examiner

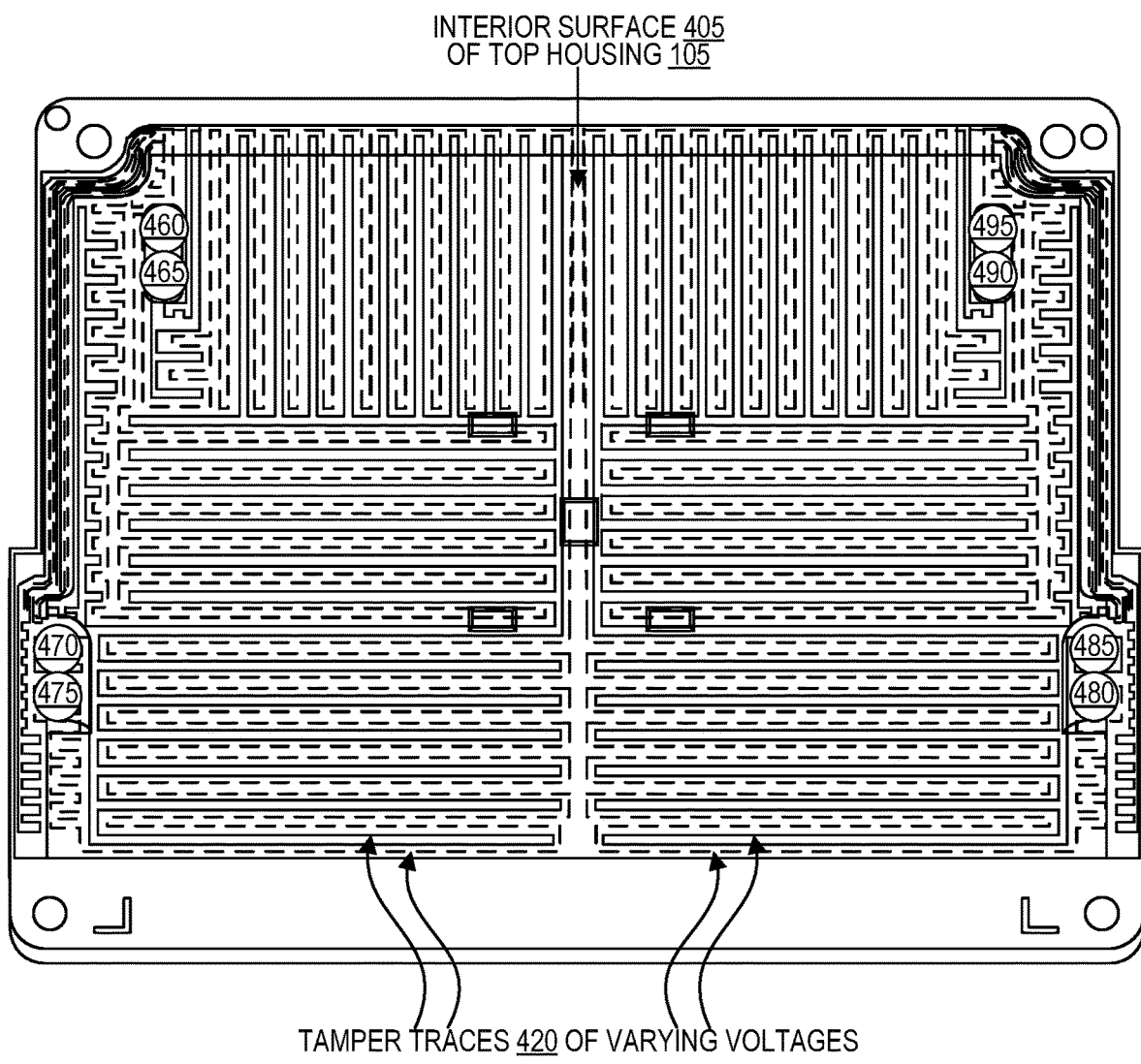

WHEATSTONE BRIDGE TAMPER CIRCUIT 555

| LEGEND 560 |||
|---|---|---|
| NO. | SYMBOL | MEANING |
| 515 | +⊥ 2.2V | POWER SUPPLY (OPTIONALLY 2.2V) |
| 520 | TT⟋⌇ | TAMPER TRACE RESISTOR |
| 565 | R kΩ ⌇ | DISCRETE RESISTOR (OPTIONALLY 220kΩ) |
| 570 | ⚬ ⚬ | MONITOR NODES BETWEEN WHICH TAMPER CIRCUITRY OF CIRCUIT BOARD 100 MONITORS DIFFERENTIAL VOLTAGE |
| 535 | ⊕ | HOUSING CONNECTION NODE (SEE FIG. 4C AND FIG. 4D) |

SECURE ELECTRONIC CIRCUITRY WITH TAMPER DETECTION

CROSS-REFERENCE TO RELATED APPLICATIONS

This application is a continuation of U.S. application Ser. No. 17/214,307, filed Mar. 26, 2021, entitled "SECURE ELECTRONIC CIRCUITRY WITH TAMPER DETECTION", which is a continuation of U.S. application Ser. No. 16/248,980, filed Jan. 16, 2019, entitled "SECURE ELECTRONIC CIRCUITRY WITH TAMPER DETECTION", issued as U.S. Pat. No. 10,977,393, which is a continuation of U.S. application Ser. No. 15/250,468, filed Aug. 29, 2016, entitled "SECURITY HOUSING WITH RECESSES FOR TAMPER LOCALIZATION", and issued as U.S. Pat. No. 10,192,076, the full disclosures of which are expressly incorporated herein by reference in their entireties.

BACKGROUND

Certain devices, such as credit card or debit card reading devices, include circuitry that reads, stores, or transmits sensitive information. Sensitive information can include credit card numbers, debit card numbers, personal identification number ("PIN") codes, or personal identification information, for example. If unprotected, a malicious party can sometimes retrieve such sensitive information from the devices by accessing the circuitry that stores or transmits the sensitive information.

Some devices that read, store, or transmit sensitive information include a tamper circuit that passes current through a tamper trace. Such a tamper circuit can detect tampering by detecting when current stops flowing along the conductive tamper trace. Such a tamper circuit can sometimes be bypassed if a malicious party short-circuits the tamper circuit, breaks or reroutes a tamper trace by drilling into the device, or floods a portion of the tamper circuit with conductive ink, among other attacks.

Thus, there is a need in the art for improved tamper circuitry.

BRIEF DESCRIPTION OF THE DRAWINGS

FIG. 4C illustrates the interior surface of the top housing with an exemplary arrangement of tamper traces of varying voltages.

DETAILED DESCRIPTION

A circuit board that reads, stores, or transmits sensitive information can be protected from tampering by enclosing at least a portion of the circuit board within a security housing. A circuit board is protected by being enclosed in a security housing that includes conductive tamper traces running along its interior surface, the conductive tamper traces being a housing portion of a tamper detection circuit. The tamper detection circuit also includes a board portion that detect tampering with the tamper detection circuit by monitoring voltages at monitor nodes along the board portion. The board portion of the tamper detection circuit is connected to the tamper traces via multiple connector pieces. The connector pieces can be held in place by board connector piece holders affixed to the board or housing connector piece holders of the housing. When tampering is detected, it can be localized based on voltages measured at multiple recesses along the housing. The tamper detection circuit can be arranged in a wheatstone bridge layout for environmental tolerance.

The tamper detection circuit, or other circuitry connected to the tamper detection circuit, can be configured to take various tamper protection actions upon detection of tampering. These tamper protection actions can include temporarily or permanently disable at least a portion of the circuit board's functionality, deleting sensitive information stored by the circuit board, encrypting sensitive information stored by the circuit board, deleting all information stored by the circuit board, encrypting all information stored by the circuit board, transmitting an alert to another system, transmitting sensitive information to another system after encryption, displaying an indicator (e.g. a light emitting diode) indicating tampering, damaging the circuit board by overheating the circuit board, damaging the circuit board by flooding it with water or conductive ink, or some combination thereof. Such tamper protection actions minimize damage caused by device tampering by preventing sensitive data from being accessed by a malicious party and by ensuring that a tampered-with device is not able to be used again in its tampered state, protecting individuals who might otherwise trust such potentially dangerous devices with sensitive information such as payment information.

Figure 1A:
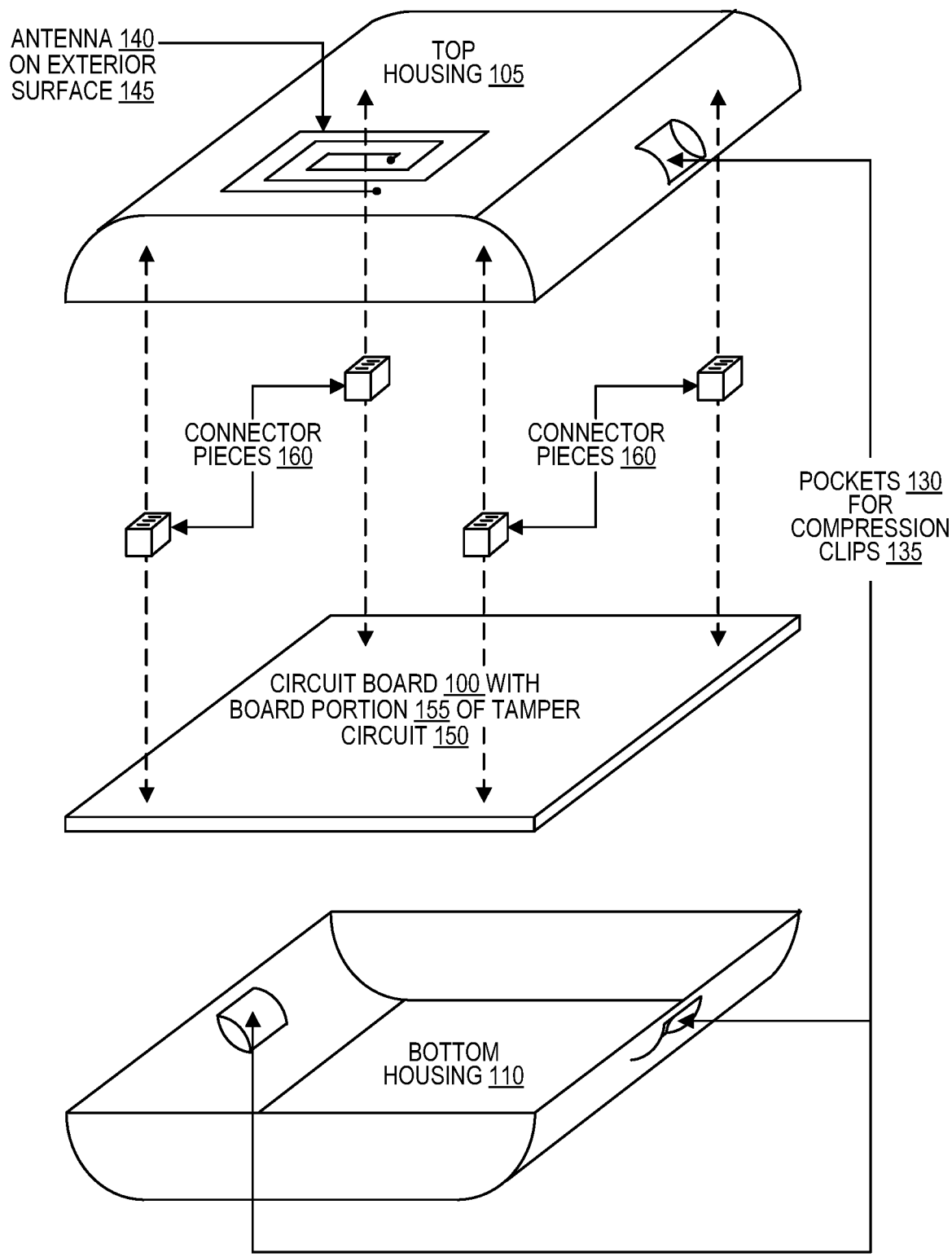
FIG. 1A is an exploded perspective view of a circuit board enclosed within a top housing and a bottom housing and connected to the top housing via connector pieces.

FIG. 1A is an exploded perspective view of a circuit board enclosed within a top housing and a bottom housing and connected to the top housing via connector pieces.

The exploded view of FIG. 1A illustrates a circuit board 100 protected by a security housing made up of a top housing 105 and a bottom housing 110. The circuit board 100 can read, store, and/or transmit sensitive information. For example, the circuit board 100 can store symmetric or asymmetric encryption keys for encrypting information transmitted to other circuitry not protected by the security housing, and can perform encryption and/or decryption operations using the encryption keys. The circuit board 100 can also include, or can be electrically connected to, one or more card reader components (not pictured) for reading transaction information stored by a transaction card such as a credit card, a debit card, an Automated Teller Machine (ATM) card, a store gift card, a public transit card, a driver's license, a personal identification card, a door entry card, a security badge, or some combination thereof. The circuit board 100 can also include, or can be electrically connected to, one or more computing interface components (not pictured) to receive transaction information from a portable computing device, such as a cellular phone or a portable media player with a wireless transaction capability through Near-Field-Communication (NFC) signals, radio-frequency identification (RFID) signals, BLUETOOTH™ wireless signals, or some combination thereof. The circuit board 100 can include non-transitory data storage media for temporarily or permanently storing such transaction information, as well as wired or wireless data transfer means, such as cables, plugs, ports, or antennae, for transferring such data. The circuit board 100 can be single-sided or double-sided, and can be a printed circuit board (PCB), a printed wiring board (PWB) with non-printed components, a perfboard, a stripboard, a breadboard, or some combination thereof.

The circuit board 100 of FIG. 1A includes board portion 155 of a tamper detection circuit 150. The board portion 155 of a tamper detection circuit 150, which on its own, is an incomplete circuit. When completed, the tamper detection circuit 150 conducts electricity across conductive tamper traces 420 (not shown in FIG. 1A) that snake around an interior surface of the security housing. One exemplary layout of the tamper traces 420 is illustrated in FIG. 4C. The tamper traces 420 can be connected to the board portion 155 of the tamper detection circuit 150 in such a way that some of the tamper traces 420 conduct different voltages than other tamper traces 420. The board portion 155 of the tamper detection circuit 150 includes monitor nodes 530 (not shown in FIG. 1A) that monitor voltages at different points and can thus detect if current stops flowing across one or more tamper traces 420, or a short circuit is experienced among the tamper traces 420, issues that can occur if a malicious party tampers with the security housing by drilling into the security housing, by attempting to reroute current within the tamper detection circuit 150, or by flooding a portion of the tamper detection circuit 150 with conductive ink. The tamper detection circuit 150, when completed, can be arranged in a discrete comparison circuit layout as illustrated in FIG. 5A or can be arranged in a wheatstone bridge layout as illustrated in FIG. 5B. The discrete comparison circuit layout can, in certain environmental conditions such as high heat or high humidity, suffer from "false positive" reports of tampering when no actual tampering has occurred due to development a parasitic resistance 590 between points of the tamper detection circuit 150 that are not directly connected. The wheatstone bridge layout solves this issue as further explained in the descriptions of FIGS. 5A and 5B.

The board portion 155 of the tamper detection circuit 150 is connected to the conductive tamper traces 420 of the security housing via connector pieces 160. Each connector piece can be at least partially elastic to ensure that the connection between the board portion 155 of the tamper detection circuit 150 and the conductive tamper traces 420 of the security housing do not disconnect during ordinary operations. Each connector piece 160 can be held in place by a board connector piece holder 255 as illustrated in FIG. 2B, a housing connector piece holder 430 as illustrated in FIG. 4E, or some combination thereof. The board portion 155 of the tamper detection circuit 150 can further be configured to detect tampering with the connector pieces 160 by detecting voltage changes caused by connections between the connector pieces 160 and various conductive elements placed around or near the connector pieces 160 that conduct different voltages than are flowing through the connector pieces themselves, such as the conductive guard rings 220 illustrated in FIG. 2A or the conductive board connector piece holders 255 illustrated in FIG. 2B, respectively.

While the exploded view of FIG. 1A illustrates both a top housing 105 and a bottom housing 110, some security housings can include only a top housing 105 or only a bottom housing 110. In embodiment with both a top housing 105 and a bottom housing 110, tamper traces 420 can run along the interior surfaces of both the top housing 105 and the bottom housing 110, or they can run along only one of the top housing 105 or the bottom housing 110. Tamper traces 420 of the top housing 105 can connect to tamper traces 420 of the bottom housing 110 or can remain separate.

Furthermore, while the top housing 105 and bottom housing 110 appear similarly shaped in FIG. 1A, this need not be the case; for example, the bottom housing 110 can be substantially flat while the top housing 105 can leave more room for components of the circuit board 100. Such an asymmetric layout can be used, for example, if the circuit board 100 is one-sided.

While the exploded view of FIG. 1A illustrates four connector pieces 160, it should be understood that in different embodiments, a different number of connector pieces 160 can be used to connect the circuit board 100 to the tamper traces 420. Likewise, while the exploded view of FIG. 1A only illustrates connector pieces 160 between the circuit board 100 and the top housing 105, in other embodiments, connector pieces 160 can be used to between the circuit board 100 and the bottom housing 110 as well.

The top housing 105 of FIG. 1A includes an antenna 140 on the exterior surface 145 of the top housing 105. The antenna 140 can be a wireless receiver antenna, a wireless transmitter antenna, or a wireless transceiver antenna. The antenna 140 can be, for example, a cellular network antenna, a Bluetooth™ local wireless connection antenna, a Bluetooth™ Low Energy (BLE) local wireless connection antenna, a radio-frequency antenna, a microwave-frequency antenna, a television-frequency antenna, a near-field-communication (NFC) antenna, an IEEE 802.11 Wi-Fi wireless antenna, or some combination thereof. While the antenna 140 of FIG. 1A is positioned along an exterior surface 145 of the top housing 105, it can alternately be included into the non-conductive interior of top housing, or can alternately be positioned along an interior surface of the top housing 105. The antenna 140 can alternately be placed along or inside the bottom housing 105.

The non-conductive portions of the top housing 105 and bottom housing 110, which may also be referred to as the non-conductive "cage" or "shell," can be made from plastic, such as thermoplastics manufactured using Laser Direct Structuring (LDS), or from other non-conductive materials. The non-conductive portions of the top housing 105 and bottom housing 110 can be fused to each other and/or to the non-conductive board of the circuit board 100 to prevent opening the security housing, or can alternately be affixed with glue, cement, or other adhesives. The non-conductive portions of the top housing 105 and bottom housing 110 are typically hard but can in some cases have a degree of flexibility. The tamper traces 420 can be laid out over the inside surface of the security housing during an LDS manufacturing process, if LDS is used.

The top housing 105 and bottom housing 110 of FIG. 1A also illustrates several pockets 130 to receive compression clips 135. The compression clips 135 function not only to keep the security housing fastened to the circuit board 100, but also to prevent bowing in the non-conductive board 200 portion of the circuit board 100 itself, a common issue that can affect circuit boards 100 over time and eventually cause damage circuitry. The compression clips 135 themselves are not pictured in FIG. 1A, but can be any type of clips that provide pressure, such as clips based on elastomers, clips based on springs, clips based on metals with elastic properties, magnetic clips, or some combination thereof. The compression clips 135 can alternately be clamps, such as manually closed screw-based clamps.

The one or more reader components of the circuit board 100 can include a magnetic read head or other type of magnetic stripe reader that is capable of reading information from a magnetic stripe of a transaction card. The one or more reader components can also include an integrated circuit (IC) chip reader for reading an IC chip embedded in a transaction card. Such an IC chip can follow the Europay-Mastercard-Visa (EMV) payment IC chip standard. The IC chip reader can be contact-based, in that it can include one or more conductive prongs that contact a conductive metal contact pad of the IC chip. The IC chip can instead be contactless and use a contactless antenna. The contactless antenna can also double as a receiver for near-field-communication (NFC) signals, radio-frequency identification (RFID) signals, BLUETOOTH™ wireless signals, or some combination thereof, which can be sent from a transaction card or from a portable computing device.

Figure 1B:
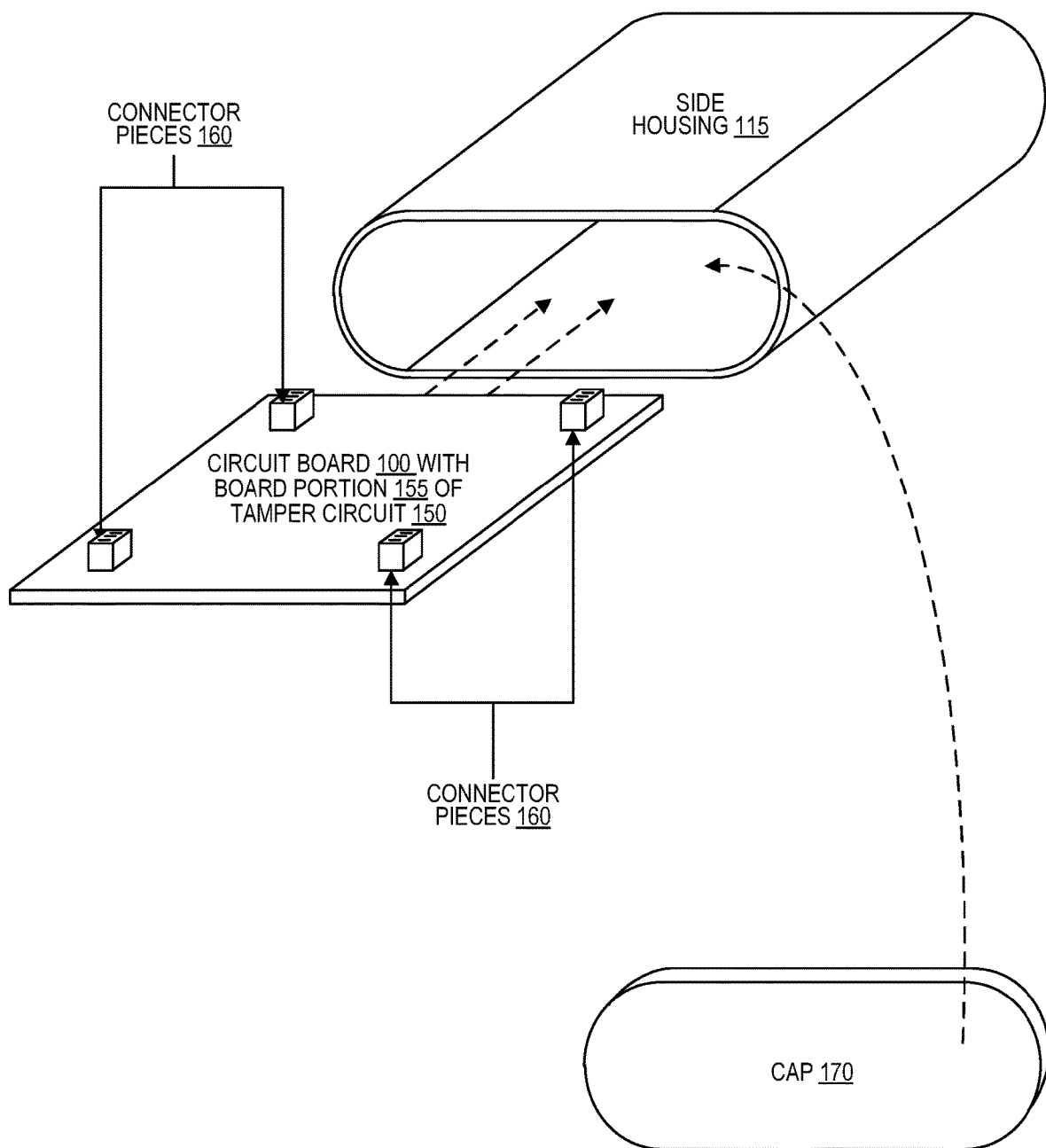
FIG. 1B is an exploded perspective view of a circuit board enclosed within a side housing and connected to the side housing via connector pieces.

FIG. 1B is an exploded perspective view of a circuit board enclosed within a side housing and connected to the side housing via connector pieces.

The side housing 115 can receive the circuit board 100 and connector pieces 160 through a side opening, after which a cap 170 can be fused or adhered to the side housing. The side housing 115 can include tamper traces 420 all along its interior. The cap 170 can likewise include tamper traces 420 along its interior surface. Any tamper traces 420 of the cap 170 can connect to tamper traces 420 of the side housing 115.

Another alternate embodiment of the security housing (not pictured) can include two smaller side housings 115 fused together, each enclosing a portion of the circuit board, including a "left-side" side housing and a "right-side" side housing, each with conductive tamper traces 420 running along its interior. Tamper traces 420 of the "left-side" side housing can connect to tamper traces 420 of the "right-side" side housing or can remain separate.

Figure 2A:
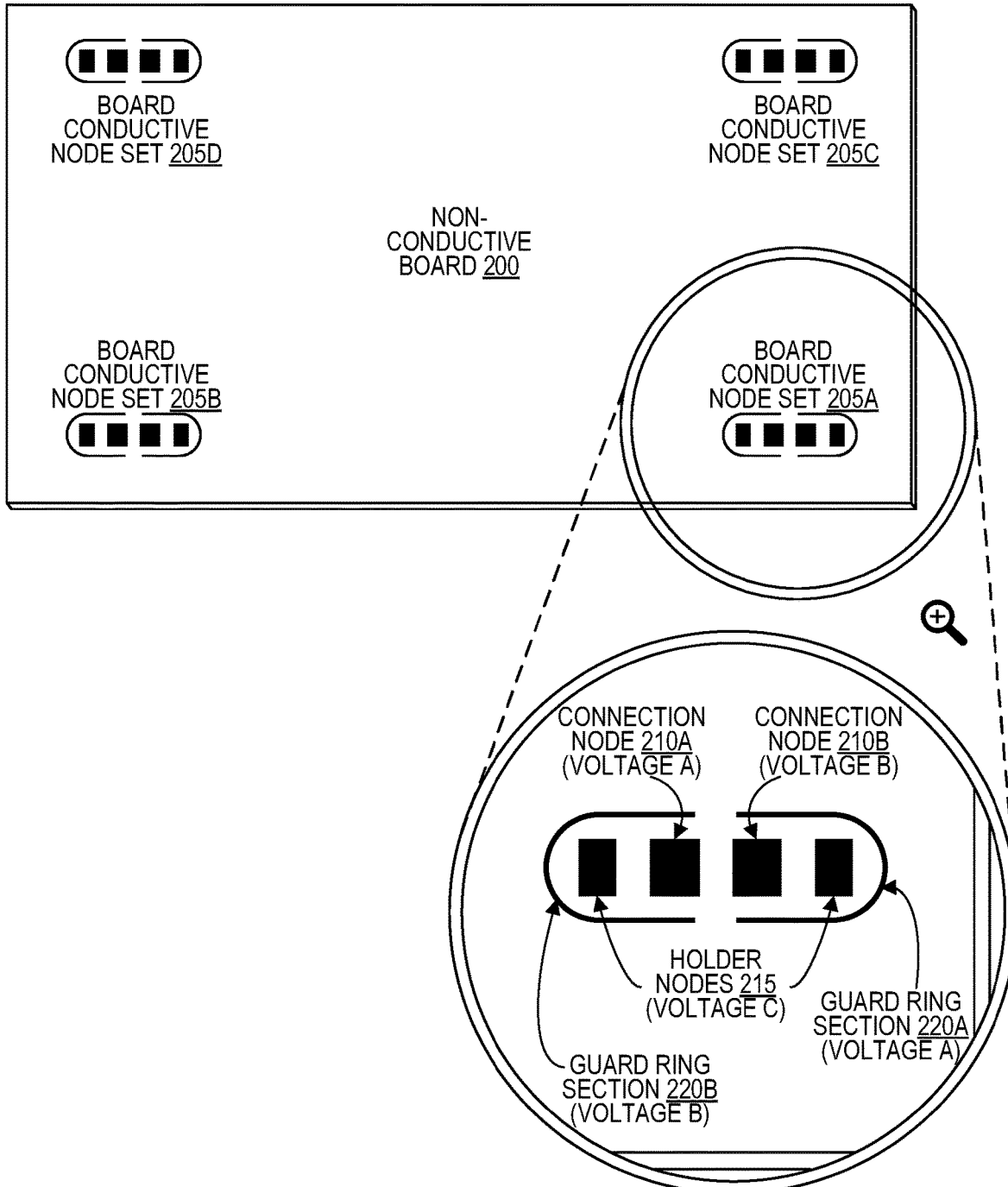
FIG. 2A illustrates a top-down view of a circuit board with four board conductive node sets, with a close-up view of one board conductive node set.
Figure 2B:
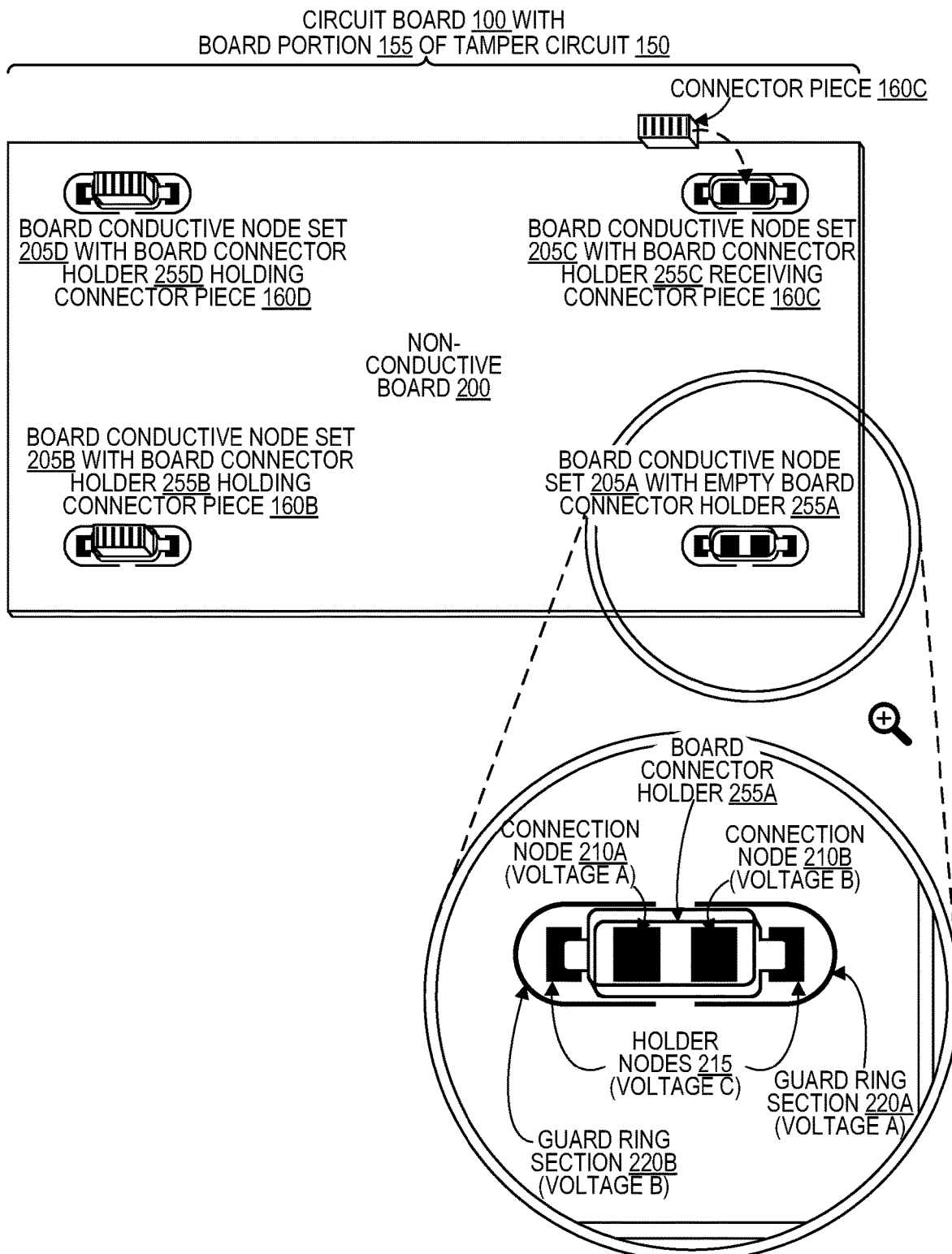
FIG. 2B illustrates a top-down view of a circuit board with four board conductive node sets, each attached to a board connector holder for holding a connector piece, with a close-up view of one board conductive node set and its attached board connector holder.

FIG. 2A illustrates a top-down view of a circuit board with four board conductive node sets, with a close-up view of one board conductive node set.

The circuit board 100 of FIG. 2A includes a non-conductive board 200 with four board conductive node sets 205, identified by identifiers 205A, 205B, 205C, and 205D, respectively. While the four board conductive node sets 205 are spaced roughly evenly along the non-conductive board 200, they can alternately be place asymmetrically or clustered in a different layout.

The close-up view of FIG. 2A illustrates a close-up of board conductive node set 205A. The conductive node set 205A of FIG. 2A includes a first connection node 210A configured to conduct a first voltage A and a second connection node 210B configured to conduct a second voltage B. The first connection node 210A and the second connection node 210B are configured to be connected to the tamper traces 420 via a connector piece 160, and form part of the board portion 155 of the tamper detection circuit 150.

The conductive node set 205A of FIG. 2A also includes two holder nodes 215 configured to conduct a third voltage C. The holder nodes 215 can be connected to part of the board portion 155 of the tamper detection circuit 150. This can be, for example, a grounded part of the board portion 155 of the tamper detection circuit 150, in which case the voltage C can be zero. The holder nodes 215 can alternately be connected to a separate power supply, or connected directly to ground, in which case the voltage C can again be zero. The holder nodes 215 are optional and are configured to be electrically connected to conductive board connector holders 255 as illustrated in FIG. 2B. The holder nodes 215 can be omitted if housing connector holders 430 are used instead, as illustrated in FIG. 4E, or if non-conductive board connector holders 255 are used. If the holder nodes 215 are part of the board portion 155 of the tamper detection circuit 150, then removal of a board connector holders 255 would further be detectable at the monitor nodes 530 of the board portion 155 of the tamper detection circuit 150.

The conductive node set 205A of FIG. 2A also includes a guard ring 220. One or both guard ring sections 220 can be connected to parts of the board portion 155 of the tamper detection circuit 150. The guard ring of FIG. 2A includes two guard ring sections 220, namely a first guard ring section 220A configured to conduct the first voltage A and a second guard ring section 220B configured to conduct the second voltage B. The guard ring sections of FIG. 2A are positioned so that the first guard ring section 220A partially encircles the second connection node 210B, while the second guard ring section 220B partially encircles the first connection node 210A. In this way, each guard ring section 220 carries the opposite voltage as the connection node 210 that it partially encircles, meaning that a connection between the two would cause a short detectable at the monitor nodes 530 of the board portion 155 of the tamper detection circuit 150. Such a short could be caused, for example, by a malicious party flooding the board conductive node set 205A with conductive ink.

In an alternate embodiment, the one or both guard ring sections 220 can conduct a fourth voltage D, and can be connected to a separate power supply, or connected directly to ground, in which case the voltage D can be zero. In another alternate embodiment, the guard ring can be whole rather than divided into sections.

Figure 5A:
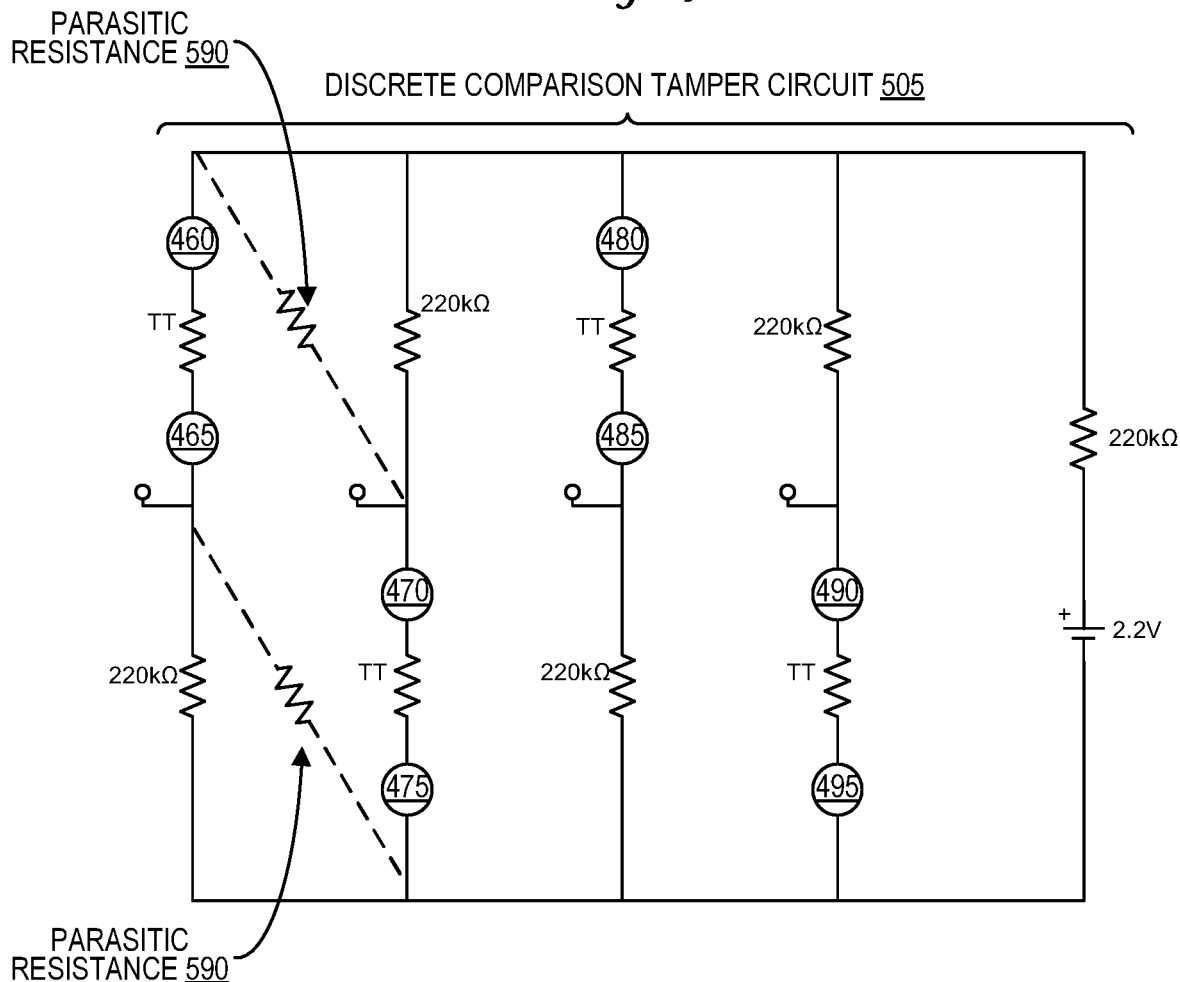
FIG. 5A is a circuit diagram illustrating a discrete comparison tamper circuit.
Figure 5B:
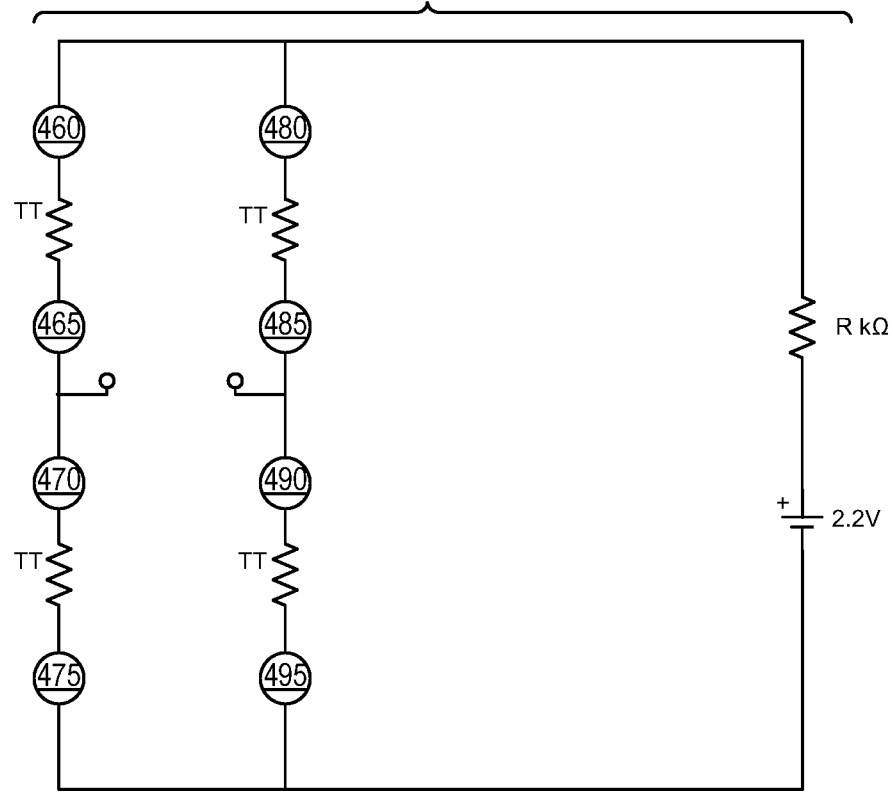
FIG. 5B is a circuit diagram illustrating a wheatstone bridge tamper circuit.
Figure 6:
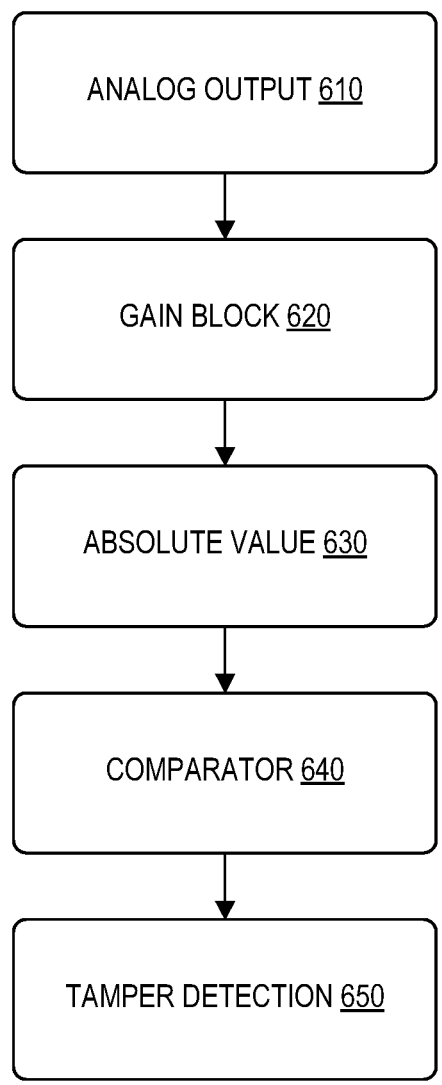
FIG. 6 is a flow diagram illustrating additional components of a tamper circuit.

The circuit board 100 of FIG. 2A can include other components not pictured in FIG. 2A, such as components for reading, storing, or transmitting sensitive information as previously described in relation to FIG. 1A, or additional components of the board portion of the tamper detection circuit 150 such as the components illustrated in FIG. 5A, 5B, or 6.

FIG. 2B illustrates a top-down view of a circuit board with four board conductive node sets, each attached to a board connector holder for holding a connector piece, with a close-up view of one board conductive node set and its attached board connector holder.

The circuit board 100 of FIG. 2B is the same circuit board 100 as the one illustrated in FIG. 2A, with the addition of four board connector holders 255. In particular, a first board connector holder 255A is illustrated over the first board conductive node set 255A, a second board connector holder 255B is illustrated over the second board conductive node set 255B, a third board connector holder 255C is illustrated over the third board conductive node set 255C, and a fourth board connector holder 255D is illustrated over the fourth board conductive node set 255D.

A second connector piece 160B is illustrated as held by the second board connector holder 255B, a third connector piece 160C is illustrated as held by the third board connector holder 255C, and a fourth connector piece 160D is illustrated as being placed into the fourth board connector holder 255D. While the first board connector holder 255A is illustrated as empty, with no corresponding first connector piece 160A, it should be understood that the first board connector holder 255A is also configured to hold a connector piece 160.

The closeup of the board conductive node set 250A of FIG. 2B is similar to the closeup of the board conductive node set 250A of FIG. 2A with the addition of the conductive board connector holder 255A. As discussed in relation to the closeup of FIG. 2A, the board connector holder 255A is electrically connected to the holder nodes 215, and therefore the board connector holder 255A itself conducts the voltage C.

Because the holder nodes 215 can be connected to the board portion 155 of the tamper detection circuit 150, the monitor nodes 530 of the board portion 155 of the tamper detection circuit 150 can detect disruption of the tamper detection circuit 150 from removal of the board connector holder 255. Furthermore, any damage to a board connector holder 255, such as damage from a malicious party drilling through a side of the security housing and through the board connector holder 255, can either sever the current running through the board connector holder 255 or can cause a short by connecting the board connector holder 255 to another element, such as the connector piece 160 enclosed within the board connector holder 255. Accordingly, use of the board connector holder 255 provides additional security.

The board connector holder 255 can be made of a metal or another conductive material, such as a carbon-based conductor. In addition to allowing the board connector holder 255 to conduct, the hardness of the material allows the board connector holder 255 to be thinner than a plastic connector holder, such as the housing connector holder 430 of FIG. 4E. The hardness of the material also allows the board connector holder 255 to be constructed to include sidewalls that are perpendicular to the non-conductive board 200, while a plastic connector holder such as the housing connector holder 430 of FIG. 4E would typically need a more sloped angle. Thus, use of board connector holders 255 allows the entire system—the circuit board 100 enclosed by the security housing—to be smaller in addition to being more secure, as compared to a system that uses housing connector holders 430 as in FIG. 4E.

Furthermore, use of board connector holders 255 can also make manufacturing easier than use of housing connector holders 430 as discussed further in relation to FIG. 4E.

In an alternate embodiment (not pictured), the board connector holder 255 can be non-conductive, and the holder nodes 215 can be missing from the board conductive node sets 205.

Figure 3A:
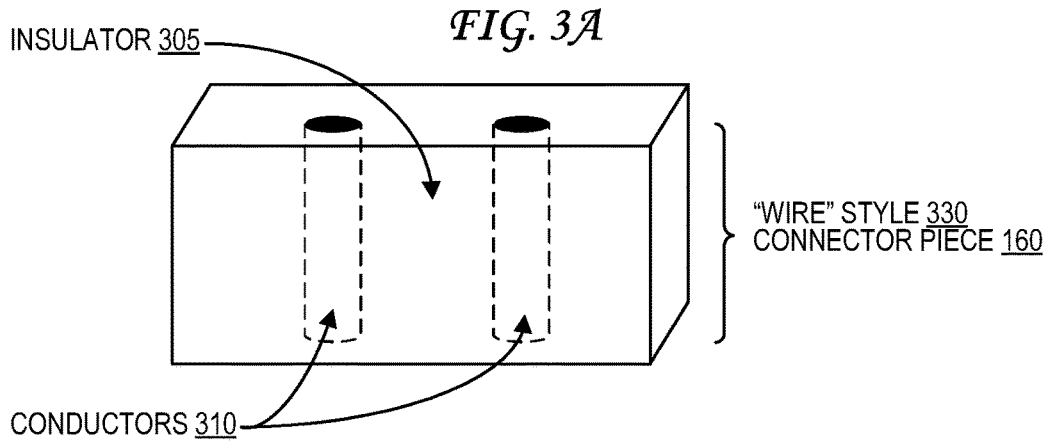
FIG. 3A illustrates a perspective view of a "wire" style connector piece.

FIG. 3A illustrates a perspective view of a "wire" style connector piece.

The majority of the "wire" style 330 connector piece 160 of FIG. 3A is comprised of an insulating material 305 that can be an elastomer, such as rubber. The "wire" style 330 connector piece 160 of FIG. 3A includes two conductive wires 310. Each of these two conductive wires of the "wire" style 330 connector piece 160 is configured to connect, via one side of the "wire" style 330 connector piece 160, to the one of the two board connection nodes 210 of a board conductive node set 205. Each of these two conductive wires of the "wire" style 330 connector piece 160 is configured to connect, via the other side of the "wire" style 330 connector piece 160, to a housing connection node at the end of a tamper trace 420. Exemplary housing connection nodes 535 are illustrated in FIGS. 4C and 4D, for example, numbered 460, 465, 470, 475, 480, 485, 490, and 495.

The "wire" style 330 connector piece 160 can cause problems, however. If one of the conductive "wires" 310 is too short, or has a break in the middle, or is dirty, or includes some other manufacturing defect, a resulting faulty connection can be interpreted as a tamper attempt by the tamper detection circuit 150, which can disable the circuit board 100. Similarly, if the "wire" style 330 connector piece 160 is inadvertently moved sideways (i.e., perpendicular to the length of the conductive wires 310), or is manufactured with one or both conductive wires 310 too far to one side, the conductive wires 310 can have a faulty connection that can be interpreted as a tamper attempt by the tamper detection circuit 150, which can disable the circuit board 100.

Figure 3B:
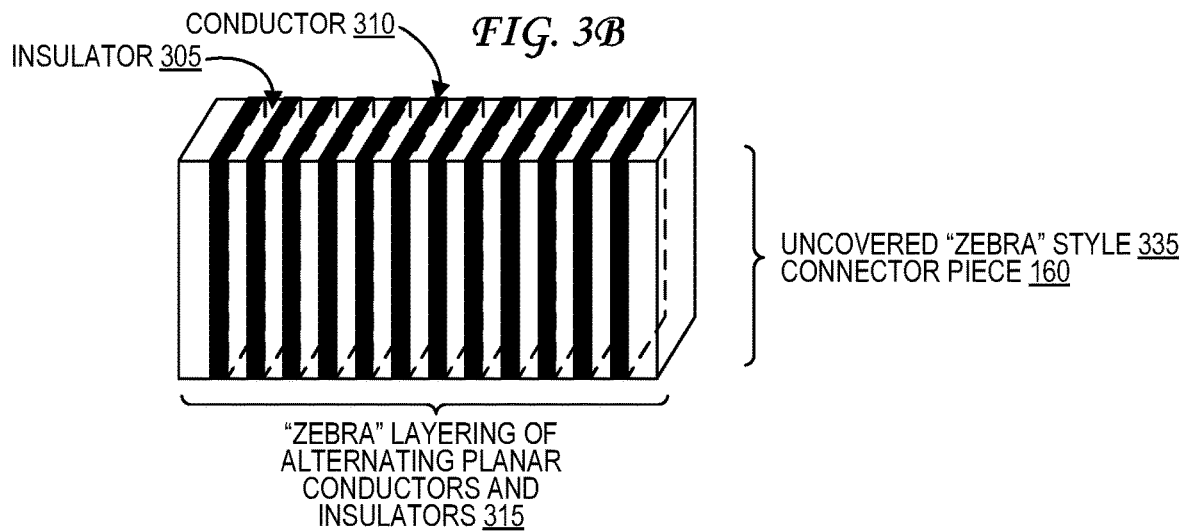
FIG. 3B illustrates a perspective view of an uncovered "zebra" style connector piece.

FIG. 3B illustrates a perspective view of an uncovered "zebra" style connector piece.

The uncovered "zebra" style 335 connector piece 160 includes alternating planar conductive and non-conductive layers, allowing each connector piece 160 to conduct multiple different signals of different voltages without shorting out. Multiple conductive layers can conduct each signal, increasing connection reliability and assembly tolerance.

The uncovered "zebra" style 335 connector piece 160, however, should not be used with a conductive holder, such as the board connector holder 255 of FIG. 2B, as an undesired connection can form between the connector piece 160 and the conductive holder. Such an undesired connection can alter the voltages measured at the measurement nodes of the board portion 155 of the tampering circuit 150 and can be interpreted as a tampering attempt.

Figure 3C:
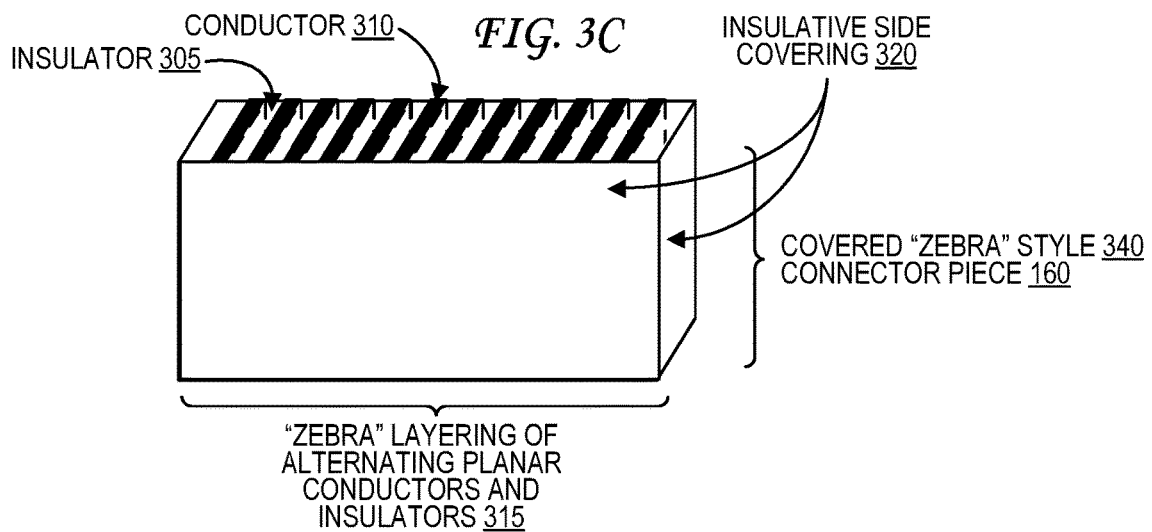
FIG. 3C illustrates a perspective view of a covered "zebra" style connector piece.

FIG. 3C illustrates a perspective view of a covered "zebra" style connector piece.

The covered "zebra" style 340 connector piece 160, like the uncovered "zebra" style 335 connector piece 160, includes alternating planar conductive and non-conductive layers, allowing each connector piece 160 to conduct multiple different signals of different voltages without shorting out.

The covered "zebra" style 340 connector piece 160 also includes an insulative side covering 320. This allows the covered "zebra" style 340 connector piece 160 to be held in place by a conductive holder, such as the board connector holder 255 of FIG. 2B, without forming a connection between the connector piece 160 and the board connector holder 255. Thus, if a covered "zebra" style 340 connector piece 160 is used, and a voltage change indicative of a connection between the connector piece 160 and the board connector holder 255 is detected, it is reasonable to assume that a malicious party has damaged the insulative side covering 320, for example by drilling into the security housing from the side, or that a malicious party has connected the connector piece 160 and the board connector holder 255 via a metal drill bit, a flood of conductive ink, or another type of tampering attempt.

Figure 4A:
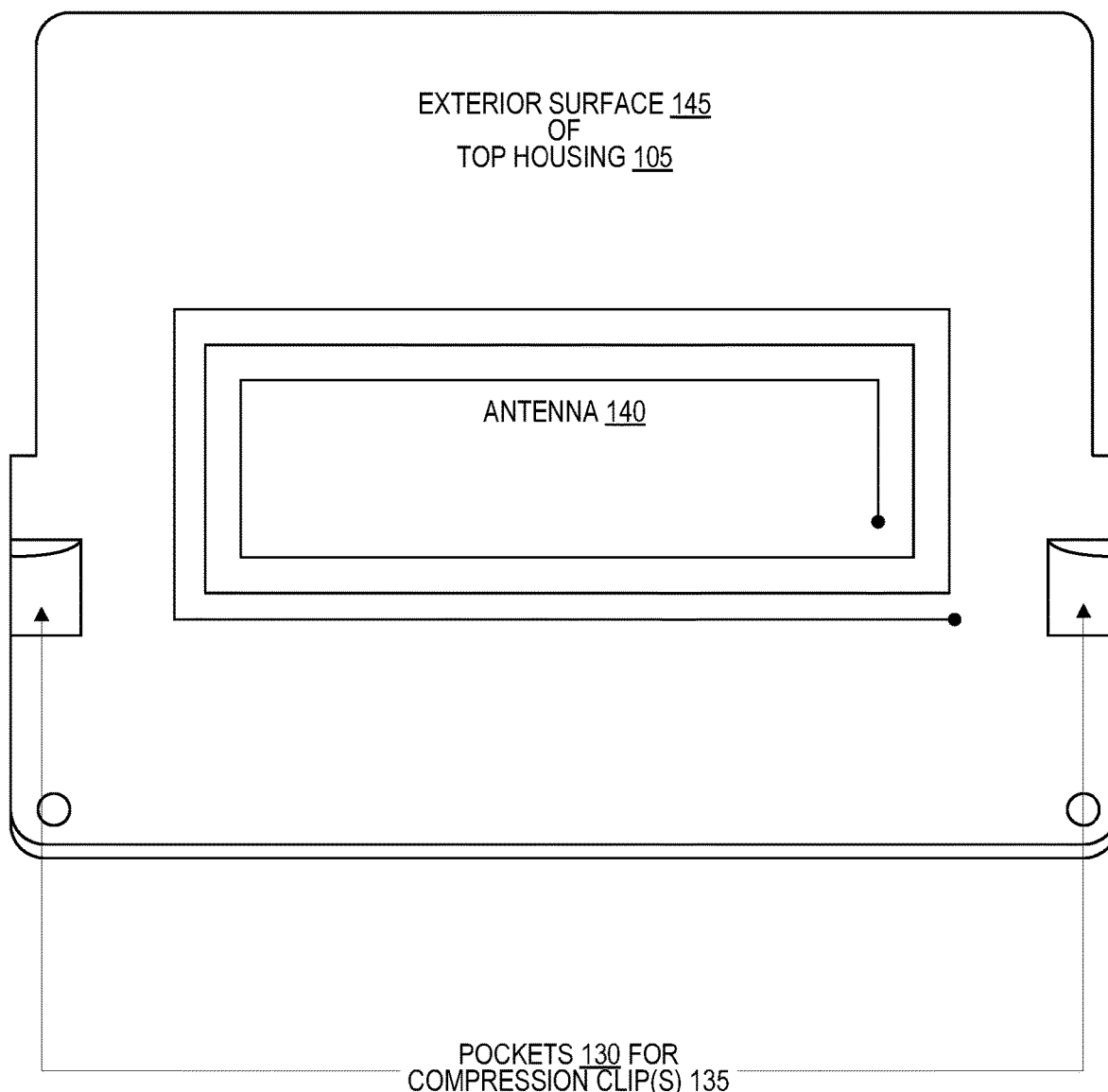
FIG. 4A illustrates an exterior surface of a top housing.

FIG. 4A illustrates an exterior surface of a top housing. The top housing 105 of FIG. 4A has a different shape than the top housing 105 illustrated in FIG. 1A. The top housing 105 of FIG. 4A also includes the antenna 140 along its exterior surface 145. The antenna 140 can be any type of antenna 140 discussed with respect to FIG. 1A.

While the housing of FIGS. 4A, 4B, 4C, 4D, and 4E are labeled as a top housing 105, it should be understood that a bottom housing 110 or side housing 115 can be similarly structured.

Figure 4B:
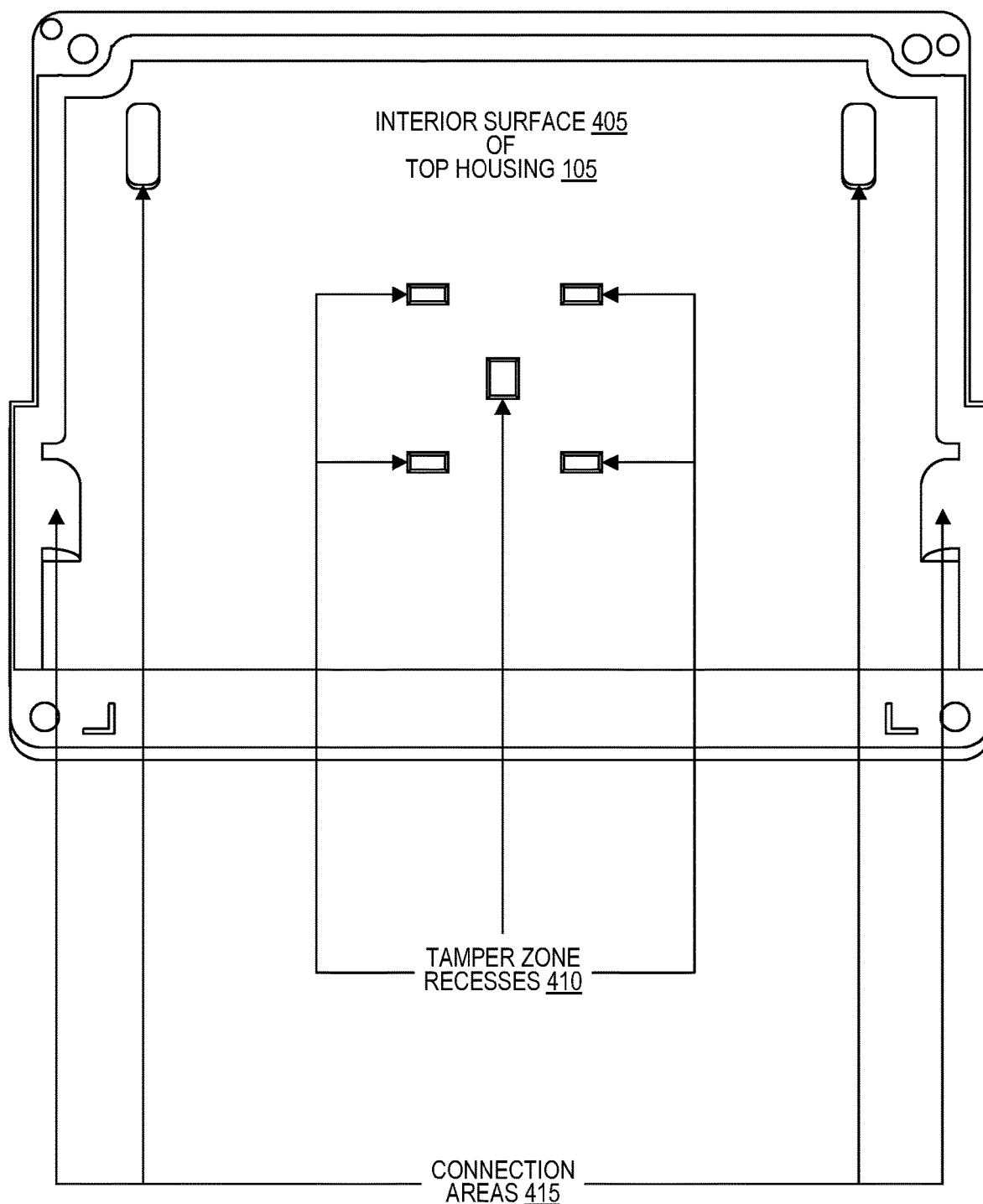
FIG. 4B illustrates an interior surface of the top housing with no conductive portions shown.
Figure 4D:
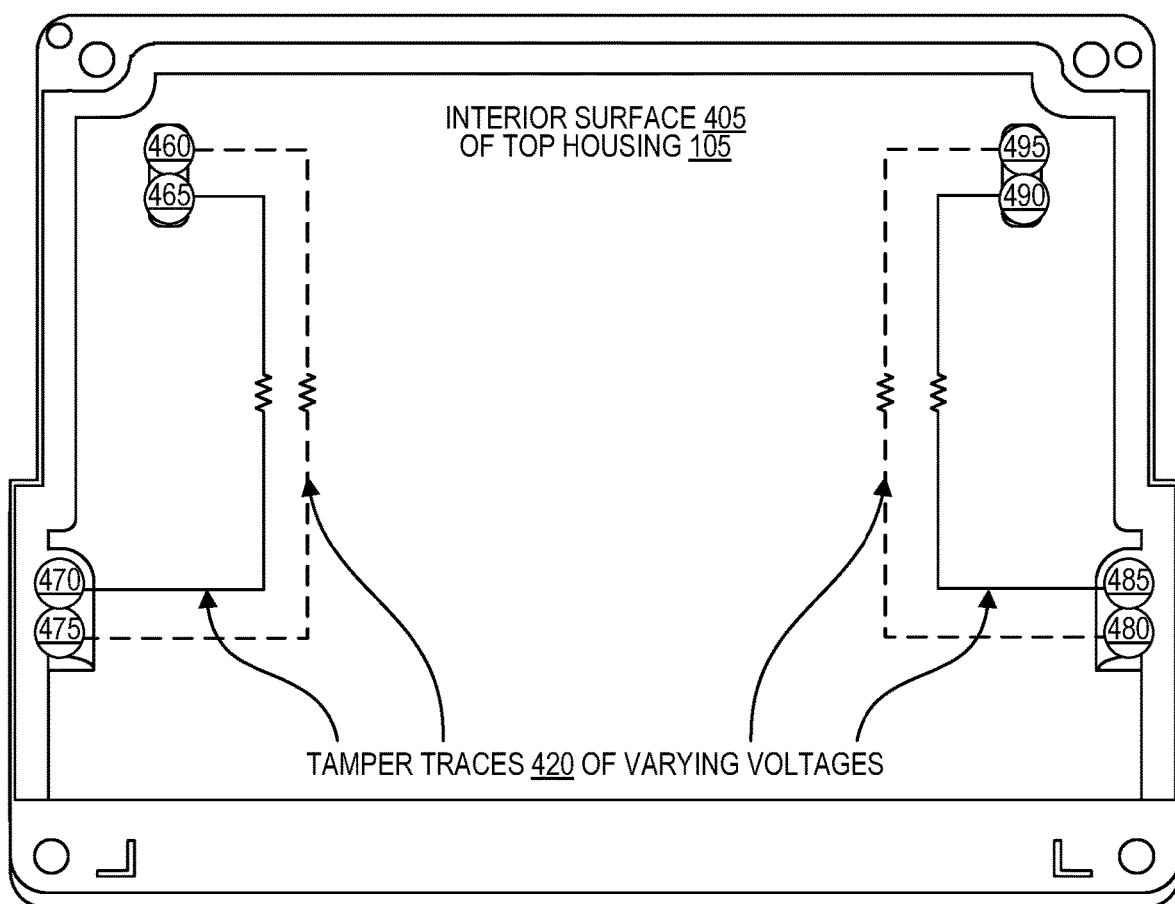
FIG. 4D illustrates the interior surface of the top housing with a schematic diagram of tamper traces of varying voltages the arrangement of FIG. 4C.
Figure 4E:
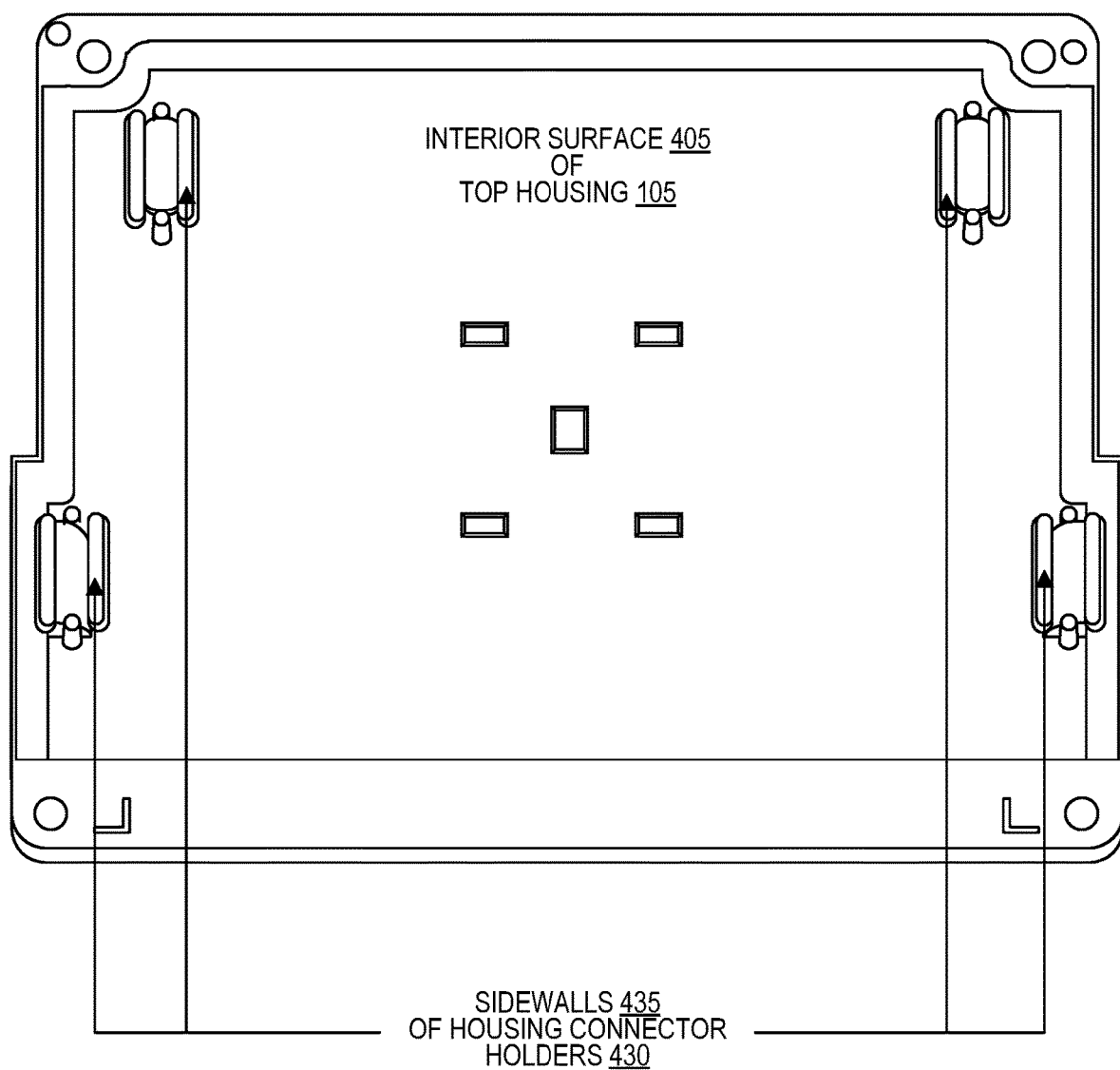
FIG. 4E illustrates the interior surface of the top housing with no conductive portions shown and with housing connector holders.

FIG. 4B illustrates an interior surface of the top housing with no conductive portions shown.

The interior surface 405 of the top housing 105 of FIG. 4B includes connection areas 415. Endpoints of the tamper traces 420, also referred to as housing connection nodes, are positioned along the connection areas 415.

The connection areas 415 can optionally be raised relative to the rest of the interior surface 405 so that the connection areas 415 are closer to the circuit board 100 than the rest of the interior surface 405 of the top housing 105.

Figure 8:
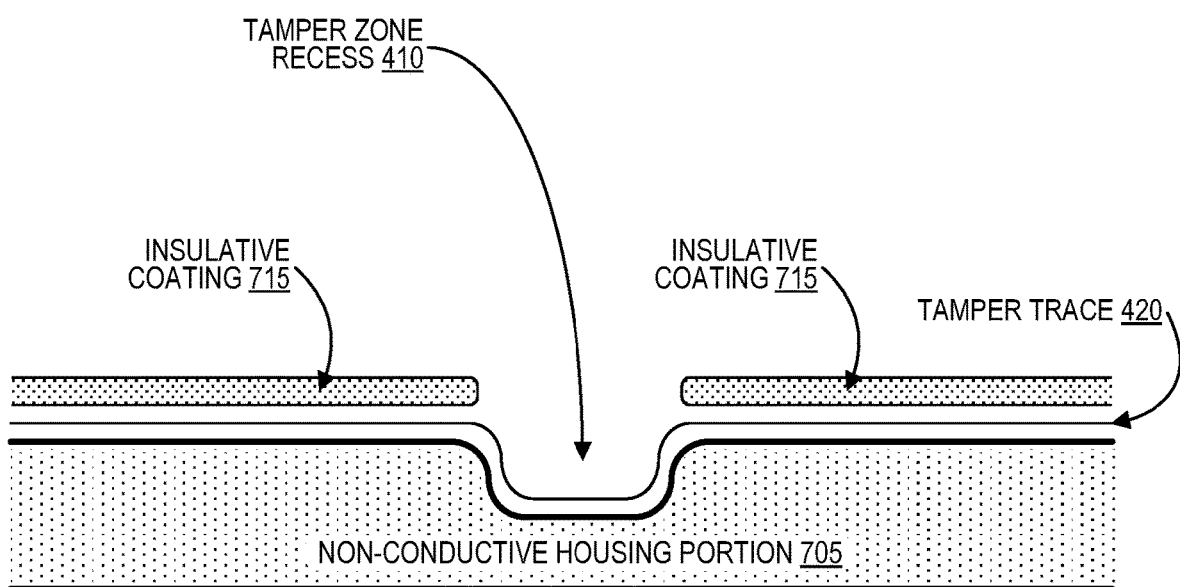
FIG. 8 is an exploded side view of an exemplary tamper zone recess.

The interior surface 405 of the top housing 105 of FIG. 4B includes tamper zone recesses 410, illustrated again with tamper traces 420 in FIGS. 4D and 8. The tamper zone recesses 410 are recesses in the non-conductive portion of the top housing. Tamper traces 420 running along the interior surface 405 dip into the tamper zone recesses 410. While the remainder of the interior surface 405 is coated with an insulative coating 715, the tamper zone recesses 410 are not, exposing the tamper traces 420. This allows voltage to be measured at different points along the tamper traces 420 via a multimeter or other type of voltage probe, allowing a "post-mortem" to be performed on a tampered-with system to identify a localized "tamper zone" in which the failure/tampering occurred, thereby identifying or helping to identify how the system was tampered with. The multimeter or voltage probe may be part of the circuit board 100, or directed by the circuit board, or may be separate from the system. In some cases, a voltage probe may be permanently coupled to each of the tamper zone recesses 410 for additional real-time monitoring of the tamper detection circuit 150 by the circuit board 100, for example by the board portion 155 of the tamper detection circuit 150.

FIG. 4C illustrates the interior surface of the top housing with an exemplary arrangement of tamper traces of varying voltages.

Some of the tamper traces 420 of FIG. 4C are illustrated using solid lines, while others are illustrated using dashed lines. These are illustrated differently to illustrate different voltages that the tamper traces 420 are configured to convey.

The tamper traces 420 of FIG. 4C run through the tamper zone recesses 410 identified in FIG. 4B. The endpoints of the tamper traces 420, also referred to as housing connection nodes, are positioned along the connection areas 415 identified in FIG. 4B. The housing connection nodes are identified numerically in FIG. 4C, specifically numbered 460, 465, 470, 475, 480, 485, 490, and 495.

In particular, one tamper trace 420 of FIG. 4C runs from housing connection node 460 to housing connection node 475. Another tamper trace 420 runs from housing connection node 465 to housing connection node 470. Another tamper trace 420 runs from housing connection node 480 to housing connection node 495. The last tamper trace 420 of FIG. 4C runs from housing connection node 485 to housing connection node 490.

The tamper traces 420 of FIG. 4C are laid out to cover the entirety of the interior surface 405 of the housing 105, including the sidewall surfaces and the connection areas 415. The tamper traces 420 of FIG. 4C are laid out so that tamper traces 420 of different voltages run parallel to each other, so that a malicious party's metal drill bit boring through the housing 105 shorts out the tamper detection circuit 150 by connecting tamper traces 420 of differing voltages.

In one embodiment, the tamper traces 420 can be arranged to serve not only as part of the housing portion of the tamper detection circuit 150, but also simultaneously as an antenna 140 as described in relation to FIG. 1A or FIG. 4A. Such an antenna 140 can be any type of antenna 140 discussed with respect to FIG. 1A.

FIG. 4D illustrates the interior surface of the top housing with a schematic diagram of tamper traces of varying voltages the arrangement of FIG. 4C.

The simplified arrangement of tamper traces 420 of FIG. 4D includes the same layout of tamper trace 420 endpoints as FIG. 4C. That is, a first tamper trace 420 of FIG. 4D runs from housing connection node 460 to housing connection node 475. Another tamper trace 420 runs from housing connection node 465 to housing connection node 470. Another tamper trace 420 runs from housing connection node 480 to housing connection node 495. The last tamper trace 420 of FIG. 4D runs from housing connection node 485 to housing connection node 490.

FIG. 4E illustrates the interior surface of the top housing with no conductive portions shown and with housing connector holders. The housing of FIG. 4E is illustrated without any of its conductive tamper traces 420 for visual clarity.

As discussed in relation to FIG. 2B, a system (i.e., a circuit board 100 and enclosed by a security housing) using board connector holders 255 can be built to be smaller and more secure than a system using housing connector holders 430 as in FIG. 4E.

Furthermore, use of board connector holders 255 can also make manufacturing easier than use of housing connector holders 430 as in FIG. 4E. Housing connector holders 430 typically need plastic sidewalls 435, which, to be secure, should also include tamper traces 420. The need to add tamper traces 420 to the plastic sidewalls 435 can further increase how large they need to be, further increasing the size of the system as a whole. This, in addition to the added size and complex angles needed to produce the housing connector holders 430 adds additional complexity to the manufacturing of such a housing. For example, if the housing 105 is manufactured using LDS, multiple laser sessions could be required to cover the larger size and/or to cover the complex angles of the interior surface 405 if housing connector holders 430 are used. Etching/printing the tamper traces 420 using multiple LDS laser sessions increases the risk of a manufacturing defect; for example, a slight movement of the housing and/or laser between laser sessions could cause a misalignment along a tamper trace 420, potentially causing a break or a weak connection point along the tamper trace.

On the other hand, use of board connector holders 255 as in FIG. 2B is advantageous as it allows the housing 105 to be smaller and less complex, allowing the interior surface 405 of the housing 105 to be manufactured with fewer LDS laser sessions, or even a single LDS laser session. This, in turn, also decreases the risk of manufacturing defects such as misalignments along tamper traces 420.

FIG. 5A is a circuit diagram illustrating a discrete comparison tamper circuit. A legend 510 is included in FIG. 5A to interpret the circuit diagram.

The discrete comparison tamper circuit 505 is one layout of a compete tamper detection circuit 150. The discrete comparison tamper circuit 505 is powered by a power supply 515, which can optionally operate at 2.2 volts. The discrete comparison tamper circuit 505 includes four legs connected in parallel. Each leg includes a discrete resistor 525 connected in series with a tamper trace 420 acting as a resistor 520, with a monitor node 530 connected in series between the discrete resistor 525 and the tamper trace 420 520. The discrete resistors 525 can, for example, be 220 kiloohm (kΩ) resistors. The discrete comparison tamper circuit 505 of FIG. 5A also illustrates the positions of the housing connection nodes 535 within the circuit, including housing connection nodes 460, 465, 470, 475, 480, 485, 490, and 495.

The discrete comparison tamper circuit 505 includes four monitor nodes 530—one corresponding to each tamper trace 420. The monitor nodes 530 are monitored relative to ground.

The discrete comparison tamper circuit 505 can identify disconnections along tamper traces 420 by checking voltages at the monitor nodes 530. However, the discrete comparison tamper circuit 505 does not have a way to detect short circuits, and therefore is vulnerable to malicious parties short-circuiting portions of the discrete comparison tamper circuit 505.

Furthermore, the discrete comparison tamper circuit 505 can have issues in certain environmental conditions. For example, in high heat or high humidity, a parasitic resistance 590 can develop between different legs of the discrete comparison tamper circuit 505. Two exemplary parasitic resistances 590 are illustrated in FIG. 5A. A parasitic resistance 590 develops between points on parallel legs that are not directly connected. The parasitic resistance 590 modifies the voltage monitored at the monitor nodes 530, producing a "false positive" indication of tampering when no tampering has occurred, potentially disabling the circuit board 100 as a result.

FIG. 5B is a circuit diagram illustrating a wheatstone bridge tamper circuit.

The wheatstone bridge tamper circuit 555 of FIG. 5B is also powered by a power supply 515, which again can optionally provide current at 2.2 volts. The wheatstone bridge tamper circuit 555 provides includes two legs connected in parallel, the legs including two tamper traces 420 behaving as resistors 520 in series with a monitor node 530 in between the tamper traces 420 of each leg. A differential voltage between both of the monitor nodes 530 is then tracked.

The wheatstone bridge tamper circuit 555 is able to detect short circuits along the wheatstone bridge tamper circuit 555, unlike the discrete comparison tamper circuit 505. The wheatstone bridge tamper circuit 555 is also resistant to the environmental effects that the discrete comparison tamper circuit 505 is subject to. Any parasitic resistances develop symmetrically and thus do not effect the differential voltage measured between the monitor nodes 530.

FIG. 6 is a flow diagram illustrating additional components of a tamper circuit.

The flow diagram of FIG. 6 identifies circuit components of the tamper detection circuit 150, as well as an optional order in which these circuit components are applied. The tamper detection circuit 150 receives the analog output 610 of the monitor nodes 530 as its input. These are passed through a gain block 620 to amplify the signals. These are passed through an absolute value component 630 to make voltage values positive.

The resulting voltage values are passed to a comparator 640, which results in tamper detection 650 based on the results of the comparison performed by the comparator 640. The comparator 640 in a discrete comparison circuit 505, compares the voltages at the monitor nodes 530 to ground nodes. The comparator 640 in a wheatstone bridge tamper circuit 555, compares the voltages at the monitor nodes 530 to each other.

While the flow diagram of FIG. 6 provided and described above can show a particular order of operations performed by certain embodiments of the invention, it should be understood that such order is exemplary. Alternative embodiments can perform the operations in a different order, combine certain operations, overlap certain operations, or some combination thereof.

Figure 7A:
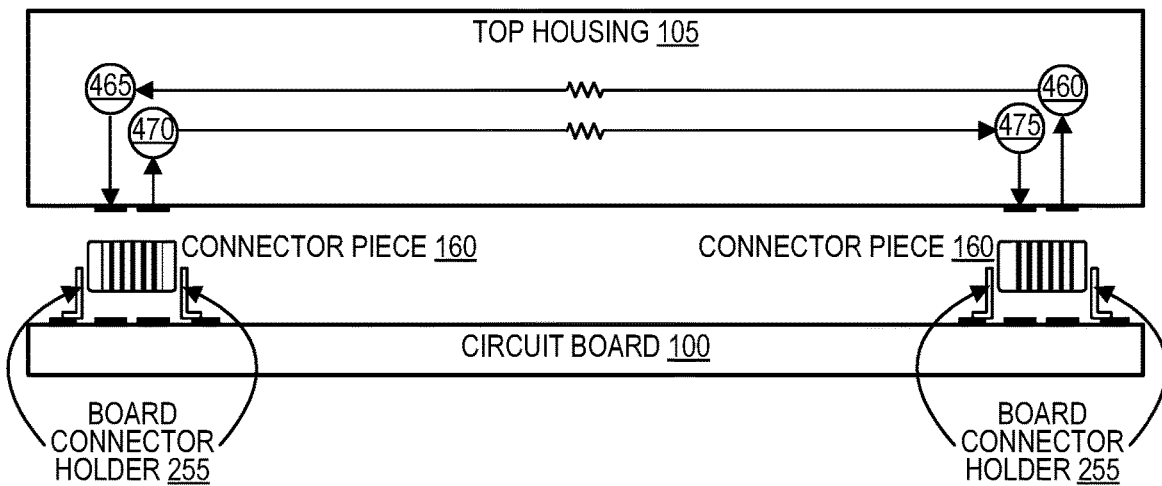
FIG. 7A is an exploded side view of a circuit board with board connector holders connecting to a top housing via connector pieces.

FIG. 7A is an exploded side view of a circuit board with board connector holders connecting to a top housing via connector pieces.

The exploded side view of FIG. 7A illustrates two tamper traces 420 and the direction in which current is flowing through them. The circuit board 100 of FIG. 7A includes board connector holders 255 keeping the connector pieces 160 in place between the circuit board 100 and the housing 105.

Figure 7B:
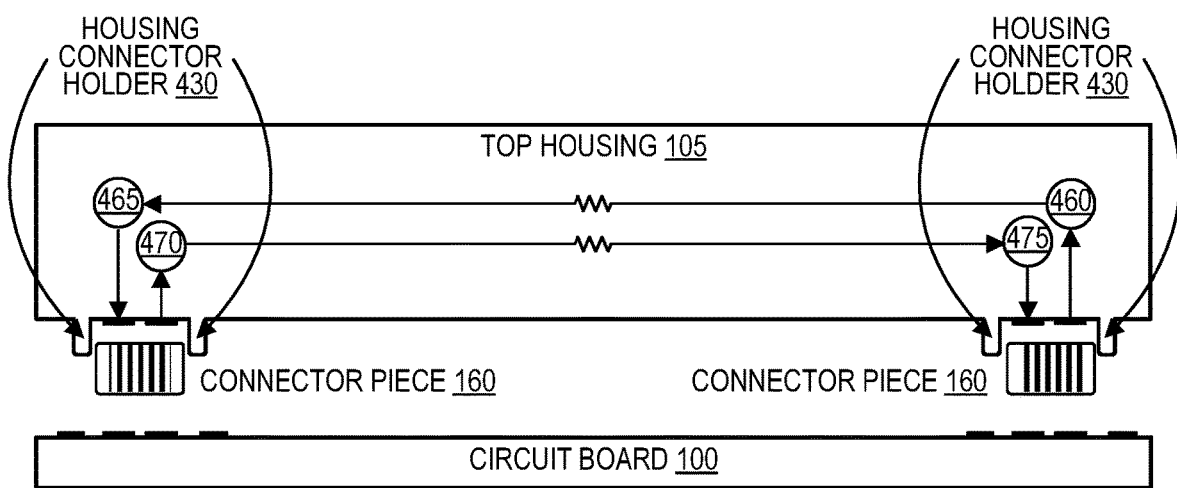
FIG. 7B is an exploded side view of a circuit board connecting to a top housing with housing connector holders via connector pieces.

FIG. 7B is an exploded side view of a circuit board connecting to a top housing with housing connector holders via connector pieces.

The exploded side view of FIG. 7B likewise illustrates two tamper traces 420 and the direction in which current is flowing through them. The circuit board 100 of FIG. 7A includes housing connector holders 430 keeping the connector pieces 160 in place between the circuit board 100 and the housing 105.

FIG. 8 is an exploded side view of an exemplary tamper zone recess.

The security housing includes a non-conductive housing portion 705. The non-conductive housing portion 705 itself includes a recess at the tamper zone recess 410 position. Each tamper trace 420, when laser-etched or otherwise laid along the non-conductive housing portion 705, is laid along the tamper zone recess 410 of the non-conductive housing portion 705. An insulative coating 715 is then laid over the tamper traces 420 other than over the tamper zone recess 410.

The tamper traces 420 are thus accessible to a multimeter or voltage probe at the tamper zone recess 410 as discussed with regard to FIG. 4B. Because the tamper trace 420 in the tamper zone recess 410 is in a recess, it is further away from the circuit board 100, preventing a the tamper traces 420 from coming into contact with the circuit board 100 and causing a short circuit or other unwanted connection. This protects both the tamper detection circuit 150 and the circuit board 100 from electrical interference.

Figure 9:
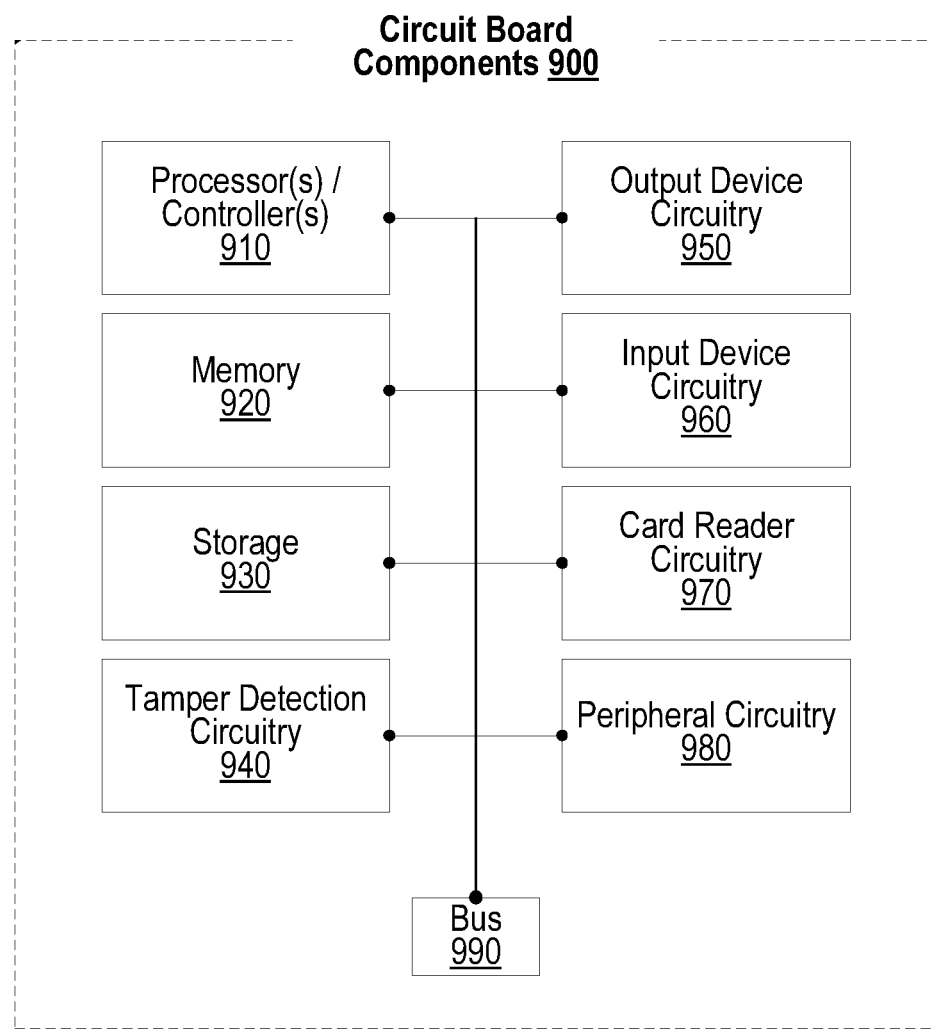
FIG. 9 is a block diagram of exemplary components that may be present on the circuit board.

FIG. 9 illustrates exemplary circuit board components 900 that may be used to implement an embodiment of the present invention. The circuit board 100 described herein may include any combination of at least a subset of the circuit board components 900. In some embodiments, the circuit board 100 may actually include multiple circuit boards connected in a wired or wireless fashion, some of which may be at least partially enclosed by the security housing.

The circuit board components 900 of FIG. 9 may include one or more processors, controllers, or microcontrollers 910. These may in some cases aid in tamper detection, such as by performing at least some subset of the functions identified in FIG. 6. The circuit board components 900 of FIG. 9 may include one or more memory components 910 that may store, at least in part, instructions, executable code, or other data for execution or processing by the processor or controller 910. The memory components 910 may include, for example, cache memory, random access memory (RAM), read-only memory (ROM), or some other type of computer-readable storage medium.

The circuit board components 900 of FIG. 9 may further includes one or more computer-readable storage medium(s) 930 for storing data, such as a hard drive, magnetic disk drive, optical disk drive, flash memory, magnetic tape based memory, or another form of non-volatile storage. These may, for example, store credit card information, cryptographic keys, or other information, and may in some cases encrypt or decrypt such information with the aid of the processor or controller 910. The computer-readable storage medium(s) 930 may in some cases store, at least in part, instructions, executable code, or other data for execution or processing by the processor or controller 910.

The circuit board components 900 of FIG. 9 may include tamper detection circuitry 940, which may include any of the tamper detection circuit 150 discussed herein, and may include the board connector piece holder(s) 255 and any components discussed in FIG. 6.

The circuit board components 900 of FIG. 9 may include output device circuitry 950, which may include, for example, communication circuitry for outputting data through wired or wireless means, display circuitry for displaying data via a display screen, audio circuitry for playing audio via headphones or a speaker, printer circuitry for printing data via a printer, or some combination thereof. The display screen may be a liquid crystal display (LCD), a plasma display, an organic light-emitting diode (OLED) display, an electronic ink display, a projector-based display, a holographic display, or some combination thereof. The printer may be inkjet, laserjet, thermal, or some combination thereof. In some cases, the output device circuitry 950 may allow for transmission of data over an headphone audio jack, a microphone jack, BLUETOOTH™ wireless signal transfer, radio-frequency identification (RFID), near-field communications (NFC), 802.11 Wi-Fi, cellular network data transfer, or some combination thereof. The output device circuitry 950 may also include The circuit board components 900 of FIG. 9 may include input device circuitry 960, which may include, for example, communication circuitry for outputting data through wired or wireless means, microphone circuitry for receiving audio data, user interface circuitry for receiving user interface inputs, or some combination thereof, and may include variable pressure detection. Touchscreens may be capacitive, resistive, acoustic, or some combination thereof. In some cases, the input device circuitry 960 may allow receipt of data over an headphone audio jack, a microphone jack, BLUETOOTH™ wireless signal transfer, radio-frequency identification (RFID), near-field communications (NFC), 802.11 Wi-Fi, cellular network data transfer, or some combination thereof. Input device circuitry 960 may receive data from an alpha-numeric keypad or keyboard, a pointing device, a mouse, a trackball, a trackpad, a touchscreen, a stylus, cursor direction keys, or some combination thereof. The input device circuitry 960 may also receive data from the card reader circuitry 970.

The circuit board components 900 of FIG. 9 may include card reader circuitry 970, which may include components capable of reading information from a transaction card, or may include circuitry supporting components capable of reading information from a transaction card, with the actual card reader components located off of the circuit board 100. Card reader circuitry 970 may include, for example, a magnetic read head or other type of magnetic stripe reader that is capable of reading information from a magnetic stripe of a transaction card. Card reader circuitry 970 can also include an integrated circuit (IC) chip reader for reading an IC chip embedded in a transaction card. Such an IC chip can follow the Europay-Mastercard-Visa (EMV) payment IC chip standard. The IC chip reader can be contact-based, in that it can include one or more conductive prongs that contact a conductive metal contact pad of the IC chip. The IC chip can instead be contactless and use a contactless antenna. The contactless antenna can also double as a receiver for near-field-communication (NFC) signals, radio-frequency identification (RFID) signals, BLUETOOTH™ wireless signals, or some combination thereof, which can be sent from a transaction card or from a portable computing device.

Peripheral circuitry 980 may include any type circuitry permitting connection and use of computer support devices to add additional functionality to the circuit board 100. For example, peripheral circuitry 980 may support connection of a modem or a router. The components shown in FIG. 9 are depicted as being connected via a single bus 990. However, the components may be connected through one or more data transport means. For example, processor unit 910 and main memory 910 may be connected via a local microprocessor bus, and the storage medium 930, tamper detection circuitry 940, output device circuitry 950, input device circuitry 960, card reader circuitry 970, and peripheral circuitry 980 may be connected via one or more input/output (I/O) buses.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A system for securing electronics, the system comprising:
    a housing for a circuit board that is configured to cover at least a portion of the circuit board, wherein the housing is distinct from the circuit board;
    a first tamper trace that runs at least from a first connection node of the housing to a second connection node of the housing, wherein the first tamper trace is configured to couple to a first set of connection nodes of the circuit board through the first connection node of the housing and the second connection node of the housing; and
    a second tamper trace that runs at least from a third connection node of the housing to a fourth connection node of the housing, wherein the second tamper trace is configured to couple to a second set of connection nodes of the circuit board through the third connection node of the housing and the fourth connection node of the housing, wherein a first part of a tamper detection circuit includes the first tamper trace and the second tamper trace, wherein a second part of the tamper detection circuit is configured to be included on the circuit board, wherein the tamper detection circuit is configured to include a first leg and a second leg that are configured to be connected in parallel, wherein the first leg includes the first tamper trace of the housing and a first monitor node of the second part of the tamper detection circuit that is configured to monitor a voltage of the first tamper trace, and wherein the second leg includes the second tamper trace of the housing and a second monitor node of the second part of the tamper detection circuit that is configured to monitor a voltage of the first tamper trace.

2. The system of claim 1, further comprising:
the circuit board.

3. The system of claim 1, wherein the tamper detection circuit is configured to include a wheatstone bridge circuit in which the first leg and the second leg are connected in parallel.

4. The system of claim 1, wherein the tamper detection circuit is configured to monitor a differential voltage between the first monitor node and the second monitor node to determine whether the tamper detection circuit has been tampered with.

5. The system of claim 1, wherein the first leg of the tamper detection circuit and the second leg of the tamper detection circuit are configured to conduct different voltages unless tampered with.

6. A system for securing electronics, the system comprising:
a housing for circuitry, wherein the housing is distinct from the circuitry;
a first tamper trace that runs at least from a first connection node of the housing to a second connection node of the housing, wherein the first tamper trace is configured to couple to a first set of connection nodes of the circuitry through the first connection node of the housing and the second connection node of the housing; and
a second tamper trace that runs at least from a third connection node of the housing to a fourth connection node of the housing, wherein the second tamper trace is configured to couple to a second set of connection nodes of the circuitry through the third connection node of the housing and the fourth connection node of the housing, wherein a first part of a tamper detection circuit includes the first tamper trace and the second tamper trace, wherein a second part of the tamper detection circuit is configured to be included in the circuitry, wherein the tamper detection circuit is configured to include a first leg and a second leg that are configured to be connected in parallel, wherein the first leg includes the first tamper trace of the housing and a first monitor node of the second part of the tamper detection circuit that is configured to monitor a voltage of the first tamper trace, and wherein the second leg includes the second tamper trace of the housing and a second monitor node of the second part of the tamper detection circuit that is configured to monitor a voltage of the first tamper trace.

7. The system of claim 6, further comprising:
the circuitry.

8. The system of claim 6, wherein the circuitry includes a circuit board.

9. The system of claim 6, wherein the tamper detection circuit is configured to include a wheatstone bridge circuit in which the first leg and the second leg are connected in parallel.

10. The system of claim 6, wherein the tamper detection circuit is configured to monitor a differential voltage between the first monitor node and the second monitor node to determine whether the tamper detection circuit has been tampered with.

11. The system of claim 6, wherein the first leg of the tamper detection circuit and the second leg of the tamper detection circuit are configured to conduct different voltages unless tampered with.

12. The system of claim 6, further comprising:
a first connector piece configured to couple the first connection node of the housing to a first connection node of the first set of connection nodes of the circuitry;
a second connector piece configured to couple the second connection node of the housing to a second connection node of the first set of connection nodes of the circuitry;
a third connector piece configured to couple the third connection node of the housing to a first connection node of the second set of connection nodes of the circuitry; and
a fourth connector piece configured to couple the fourth connection node of the housing to a second connection node of the second set of connection nodes of the circuitry.

13. The system of claim 6, wherein the housing lacks a direct wired connection between the first tamper trace and the second tamper trace unless tampered with.

14. The system of claim 6, wherein the first tamper trace and the second tamper trace are both partially covered with an insulative coating other than at least one recess in the housing.

15. The system of claim 6, wherein the first tamper trace is configured to snake around at least one surface of the housing, and wherein the second tamper trace is also configured to snake around the at least one surface of the housing.

16. The system of claim 6, wherein at least a portion of the first tamper trace is configured to be parallel to at least a portion of the second tamper trace.

17. The system of claim 6, wherein at least a portion of the first tamper trace is configured to be perpendicular to at least a portion of the second tamper trace.

18. The system of claim 6, wherein the first leg of the tamper detection circuit is configured to include at least a first resistor, and wherein the second leg of the tamper detection circuit is configured to include at least a second resistor.

19. The system of claim 6, wherein the tamper detection circuit is configured to develop parasitic resistances symmetrically between the first leg and the second leg so mitigate effects of the parasitic resistances on differential voltage between the first leg and the second leg.

20. A method of for securing electronics, the method comprising:
monitoring a tamper detection circuit using a first monitor node and a second monitor node to determine whether the tamper detection circuit has been tampered with, wherein the tamper detection circuit includes a first tamper trace that runs at least from a first connection node of a housing to a second connection node of the housing, wherein the housing is for circuitry, wherein the housing is distinct from the circuitry, wherein the first tamper trace is configured to couple to a first set of connection nodes of the circuitry through the first connection node of the housing and the second connection node of the housing, wherein the tamper detection circuit includes a second tamper trace that runs at least from a third connection node of the housing to a fourth connection node of the housing, wherein the second tamper trace is configured to couple to a second set of connection nodes of the circuitry through the third connection node of the housing and the fourth connection node of the housing, wherein a first part of a tamper detection circuit includes the first tamper trace and the second tamper trace, wherein a second part of the tamper detection circuit is configured to be included in the circuitry, wherein the tamper detection circuit is configured to include a first leg and a second leg that are configured to be connected in parallel, wherein the first leg includes the first tamper trace of the housing and a first monitor node of the second part of the tamper detection circuit that is configured to monitor a voltage of the first tamper trace, and wherein the second leg includes the second tamper trace of the housing and a second monitor node of the second part of the tamper detection circuit that is configured to monitor a voltage of the first tamper trace.

* * * * *